United States Patent
Lomax

(10) Patent No.: US 6,493,740 B1
(45) Date of Patent: Dec. 10, 2002

(54) METHODS AND APPARATUS FOR MULTI-THREAD PROCESSING UTILIZING A SINGLE-CONTEXT ARCHITECTURE

(75) Inventor: David R. Lomax, Walnut Creek, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/098,632

(22) Filed: Jun. 16, 1998

(51) Int. Cl.[7] .................................................. G06F 9/00
(52) U.S. Cl. ........................ 709/107; 717/162; 712/212
(58) Field of Search ................................ 709/100, 101, 709/102, 103, 104, 105, 106, 107; 714/212, 23; 717/162; 713/1

(56) References Cited

U.S. PATENT DOCUMENTS

| | | | | |
|---|---|---|---|---|
| 5,432,937 A | * | 7/1995 | Tavanian et al. ............ | 717/162 |
| 5,925,123 A | * | 7/1999 | Tremblay et al. ............ | 712/212 |

* cited by examiner

Primary Examiner—Majid Banankhah
(74) Attorney, Agent, or Firm—Lyon & Lyon LLP

(57) ABSTRACT

Methods and apparatus for software threads to access both shared and unshared data in a single software unit. Prior to a thread executing a set of computer language instructions in a collection of software units, it creates a copy of the respective location data segment of the collection of software units. Thereafter, prior to the thread accessing a software unit in the collection of software units that has an associated set of shared data, the thread sets a pointer in its location data segment copy to the equivalent value in the location data segment of the collection of software units. The thread will thereafter access the set of data associated with the software unit when it executes the respective software unit.

Also, prior to the thread accessing a software unit in the collection of software units that has an associated set of unshared data, the thread creates a copy of the set of unshared data. The thread thereafter sets a pointer in its location data segment copy to the start address in memory of the local copy of the unshared data set. The thread will thereafter access the local set of unshared data when it executes the respective software unit.

31 Claims, 16 Drawing Sheets

METHODS AND APPARATUS FOR MULTI-THREAD PROCESSING UTILIZING A SINGLE-CONTEXT ARCHITECTURE

FIELD OF THE INVENTION

The field of this invention pertains to computer systems, and more particularly, is directed to multi-threaded processing in a computer system.

DESCRIPTION OF THE TECHNOLOGY

A typical computer system is comprised of a collection of software, accessible by a variety of executing threads; i.e. applications.

As shown in FIG. 2, software code may be organized into software libraries 101. A software library 101 is a collection of software packages 103. A software package 103 is a collection of related procedures 105 and/or functions 107, collectively termed routines, stored together in the computer system for continued use as a unit. Software packages 103 provide a method of encapsulating and storing related procedures 105 and functions 107 together as a unit.

Procedures 105 and functions 107 each consist of a set of computer language statements functionally grouped together as an executable unit to perform a specific task. Procedures 105 and functions 107 are essentially equivalent constructs, except that functions 107 return a single value to the caller, while procedures 105 do not return any value. Procedures 105 and functions 107 may be called explicitly by applications or user stations of a computer system.

A typical multi-context/shared data architecture for a computer system, as depicted in FIG. 3, has a plurality of software packages in a software library 201. Each software package has a related context associated with it. A context in this multi-context/shared data architecture is a collection of data required by the routines of a software package to execute properly. Thus, the software package 202 is associated with the context 203, the software package 204 is associated with the context 205 and the software package 206 is associated with the context 207.

The data in each context in the software library 201 is designated, i.e., designed to be, shared, or global, or exposed, data. Thus, threads executing the software library, either consecutively or concurrently, access the same data in a context when they call the same routines of a software package.

Threads are lightweight processes that exist within a larger process. In a multi-context/shared data architecture, threads share the same software code and related data, but have their own individual program counters, machine registers and stacks. A process is a mechanism that can execute a series of steps; some systems refer to processes as "jobs" or "tasks".

For example, if there are two threads 304 and 306, as depicted in FIG. 4A, executing consecutively, and both call the same procedure 305 in the software package 302, then both threads 304 and 306 share data in the context 303. However, because the two threads 304 and 306 execute consecutively, i.e., one after the other, there are no data access contention issues. As one thread executes before the other, the first thread to execute finishes accessing the shared data in the context 303 before the second thread begins to execute. Executing consecutively, threads 304 and 306 will not access the same data at the same time.

Yet, if the same two threads 304 and 306 execute concurrently, and both threads 304 and 306 call the same procedure 305 in the software package 302, the situation raises data access contention concerns. This is because both threads 304 and 306 may potentially attempt to access the same data in the context 303 at essentially the same time.

In such a situation, one thread may change the value of a data item that a second thread is relying on to have an original, unchanged value. This can result in faulty processing by the second thread. Thus, when two or more threads may potentially access the same data at the same time, a mutual exclusivity mechanism, i.e., a mutex, is generally required to manage access to the shared data in the context 303.

A mutex may be a semaphore 312. When a first thread 304 calls 308 a procedure 305 in a software package 302, thereby accessing data in the related context 303, the semaphore 312 associated with context 303 is set. When a second thread 306 thereafter calls 310 the procedure 305 in the software package 302, involving access to the data in the related context 303, the second thread 306 first checks the context 303 associated semaphore 312. As semaphore 312 has been set by the first thread 304, the second thread 306 must wait to gain access to data in the context 303.

When the first thread 304 exits from the procedure 305 in the software package 302, it no longer requires access to the data in the related context 303. Thus, the semaphore 312 is reset to indicate that the data in the context 303 is not being accessed. Sometime thereafter, when the second thread 306 checks the semaphore 312 and discovers that it indicates that the data in the context 303 is not being accessed, then the semaphore 312 is once again set, and the second thread 306 continues its processing, executing the procedure 305.

As with the first thread 304, when the second thread 306 exits the procedure 305 in the software package 302, it no longer requires access to the data in the related context 303. Thus, the semaphore 312 is once more reset to indicate that the data in the context 303 is not being accessed.

A package that uses shared data and relies on a mutex to protect the data from access contentions is referred to as a thread-safe package. An advantage of a thread-safe package is that threads may share the same data. Another advantage of a thread-safe package is that it conserves memory space. The same data is used by each thread calling a particular routine in a specific software package. Thus, in computer systems where memory space and/or allocation are at a premium, thread-safe packages are favored.

A disadvantage of thread-safe packages is that their use can affect the processing time of concurrently executing threads. For example, if there are ten threads executing concurrently and they all call a routine in the same software package at essentially the same time, then nine threads will thereafter have to wait for the first thread to gain access to the data in the related context to exit the associated routine. Thereafter, eight threads will have to wait for the second thread to gain access to the data in the related context to exit the associated routine, and so on. The tenth thread to gain access to the respective data, thereby continuing its processing, may be forced to wait a relatively long time to do so. In time critical processing threads, this wait may fail to meet established system performance requirements.

In an alternative multi-context/unshared data architecture, an example of which is depicted in FIG. 4B, the data in each context is designated unshared, or private, or local. With this architecture, threads executing either consecutively or concurrently create a copy of the context for each software package that they access via a routine call. The software packages in a multi-context/unshared data architecture do not rely on a mutex to protect data from concurrent access. Thus, these packages may be referred to as non thread-safe packages.

Non thread-safe packages, rather than using mutexes for data protection, rely on the accessing threads to first make a copy of the package's context, and thereafter execute the respective routines using the context copy.

For example, if two threads 404 and 406 execute consecutively, and both threads call the same procedure 405 in the software package 402, then both threads will need to access the data in the related context 403. As the software package 402 is non thread-safe, meaning its related data in the context 403 is not to be shared, when a first thread 404 calls 408 procedure 405 in the software package 402, a copy 412 of the context 403 is created for this first thread's use. Likewise, when a second thread 406 calls 410 procedure 405, a copy 414 of the context 403 is created for this second thread's use.

The processing is similar if both threads 404 and 406 execute concurrently. When the first thread 404 calls 408 procedure 405 in the software package 402, a copy 412 of the context 403 is created for this first thread's use. When the second thread 406 calls 410 procedure 405, a copy 414 of the context 403 is created for this second thread's use.

An advantage of a non thread-safe package is that, when more than one thread concurrently calls one of its routines, thread processing may be expected to be quicker than if the package was thread-safe, and, therefore, used a mutex to control access to its shared data. For example, as shown in FIG. 4B, the second thread 406 does not have to wait for the first thread 404 to execute the procedure 405 before it may execute the procedure 405. Because each thread 404 and 406 in this system uses its own copy of the context 403, coordination and control of the data access between these threads is not required.

However, a disadvantage of a non thread-safe package is that it does not allow for the sharing of data, which may be a requirement or a desired feature of the system. Further, the use of a non thread-safe package can entail significantly more memory than the use of an equivalent thread-safe package. For each thread that executes, i.e., runs, in a multi-thread/unshared data system, a copy of the context for each package accessed must be created. For example, if there are ten threads executing, and they all call a routine in the same software package, and the related context is one megabyte in size, than an additional ten megabytes of memory must be available for creating the context copies. For systems in which the memory space is small, or, for whatever reason, is at a premium, the multi-context/unshared data architecture can prove unworkable.

An additional problem with either architecture, i.e., multi-context/shared data or multi-context/unshared data, is that a thread calling a particular routine in a software package must be cognizant of the individual software package's associated context. Further, the thread, if it calls several routines from a variety of software packages, must keep track of which context is associated with which software package. This can add to the data management requirements, thereby increasing the overall complexity of a thread's processing.

For example, in a multi-context/shared design system, a thread calling a routine in a first software package must be able to identify the first software package's associated context, and distinguish it from the contexts associated with other software packages, in order to correctly manage the mutex for the first software package. Additionally, each context may have a different access mechanism, requiring a thread to keep track of and use different access mechanisms to different contexts. In a computer system using multi-context/unshared data, a thread calling a routine in a first software package must be able to identify the first software package's associated context, and distinguish it from the contexts associated with other software packages, in order to create a copy of the correct context. Too, in a computer system using multi-context unshared data, a thread may have to access the individual contexts of various software packages differently, in order to create the respective copies thereof.

It would, therefore, be advantageous to provide a simple, single, uniform interface for threads to use to access the various data segments of a software library, or any collection of software units and their related data.

Further, it would be advantageous to provide a mechanism whereby threads can access both shared and unshared data in the same software unit, e.g., a software package. This would provide flexibility both in handling memory allocation issues and time processing concerns in a computer system. A more optimum computer system for handling multi-thread processing would thereby be created.

SUMMARY OF THE INVENTION

The invention provides a computer system with a single, common interface to the data segments of a collection of software units. The invention further provides apparatus and methods for allowing threads to access both shared and unshared data in a single software unit.

In an embodiment, a collection of software units is comprised of units that are associated with data segments of shared data, i.e., thread-safe software units, and units that are associated with data segments of unshared data, i.e., non thread-safe software units. A collection of location variables, generally stored in a location data segment, is associated with the collection of software units. Each location variable is associated with an address for a data segment for a software unit.

Each time a thread is to execute software in the collection of software units it creates a version of the respective location data segment. If the thread will thereafter access a software unit that has associated shared data, the thread sets a pointer in its location data segment version to the equivalent value in the respective location data segment. In this manner, the thread will access the associated data segment of the software unit when it accesses the software unit.

If the thread will access a software unit that has associated unshared data, the thread creates a copy of the respective unshared data segment. The thread then sets a pointer in its location data segment version to point to the address of the unshared data segment copy. In this manner, the thread will access its copy of the unshared data segment when it accesses the respective software unit.

Thus, a general object of the invention is to provide a flexible multi-thread environment in which each thread can access data segments associated with a collection of software units via a single interface. A further general object of the invention is to allow threads to access both shared and unshared data in the same collection of software units. Other and further objects, features, aspects and advantages of the invention will become better understood with the following detailed description of the accompanying drawings.

DESCRIPTION OF THE PREFERRED EMBODIMENTS

In the following description, for purposes of explanation, numerous specific details are set forth in order to provide a thorough understanding of the invention. It will be apparent, however, to one skilled in the art, that the invention may be practiced without these specific details. In other instances, well-known structures and devices are shown in block diagram form in order to avoid unnecessarily obscuring the invention.

A computer system generally may take many forms, from a configuration including a variety of processing units, as further described herein, networked together to function as a integral entity, to a single computer, e.g., a personal computer, operational in a stand-alone environment. The invention can be embodied in any of these computer system configurations.

Figure 1A:
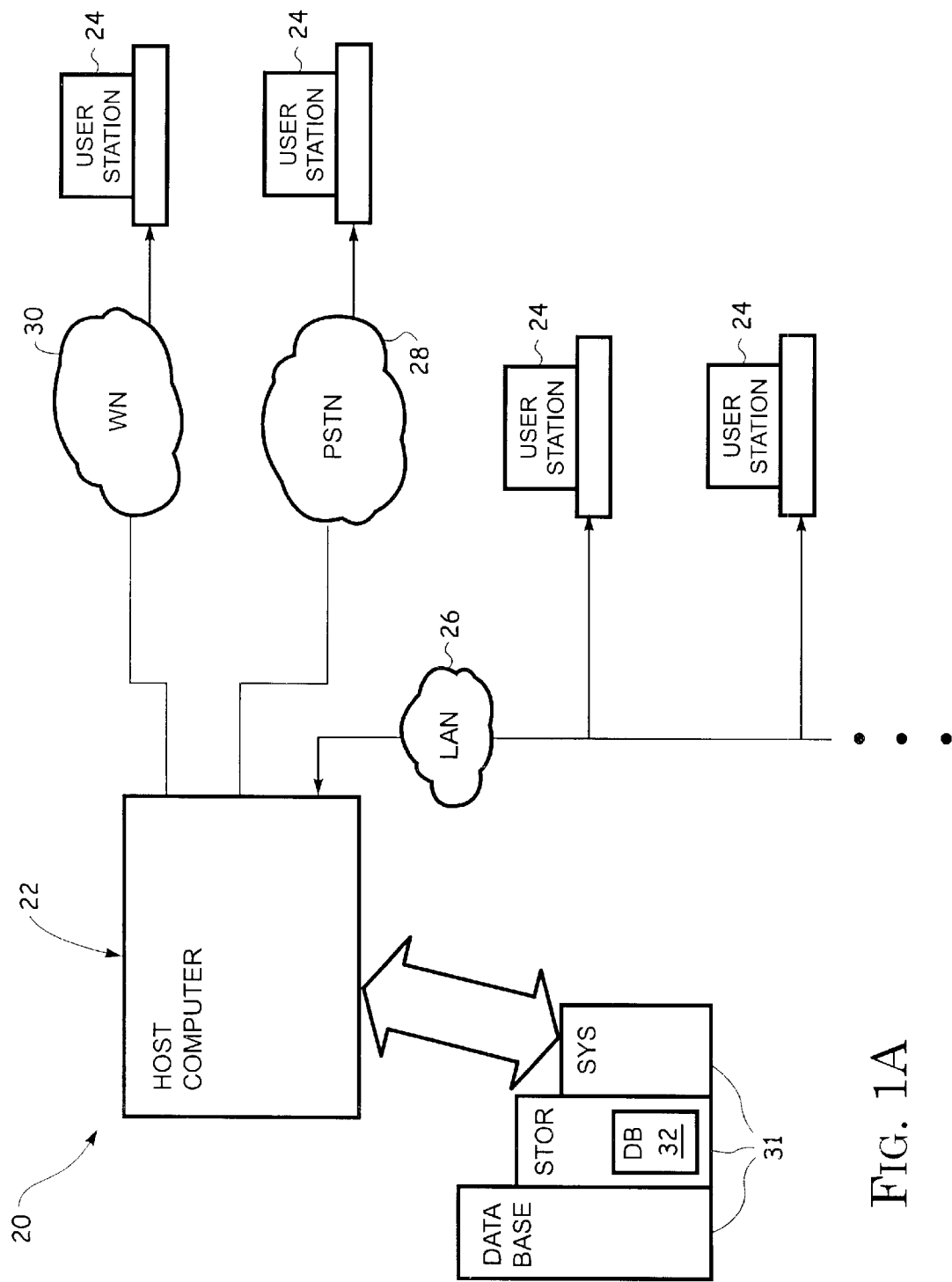
FIG. 1A is a simplified block diagram of an exemplary computer system.

Referring to FIG. 1A, in an embodiment, a computer system 20 includes a host computer 22 connected to a plurality of individual user stations 24. In one embodiment, the user stations 24 each comprise suitable data terminals, such as, e.g., personal computers, portable laptop computers, or personal data assistants ("PDAs"), which can store and independently run one or more applications. For purposes of illustration, some of the user stations 24 are connected to the host computer 22 via a local area network ("LAN") 26. Other user stations 24 are remotely connected to the host computer 22 via a public telephone switched network ("PSTN") and/or a wireless network 30.

In an embodiment, the host computer 22 operates in conjunction with a data storage system 31, wherein the storage system 31 contains a database 32 that is readily accessible by the host computer 22. In an embodiment, the database 32 is a relational database.

In alternative embodiments, the database 32 may be resident on the host computer, stored, e.g., in the host computer's ROM, PROM, EPROM, or any other memory chip, and/or its hard disk. In yet alternative embodiments, the database 32 may be read by the host computer 22 from one or more floppy disks, flexible disks, magnetic tapes, any other magnetic medium, CD-ROMs, any other optical medium, punchcards, papertape, or any other physical medium with patterns of holes, or any other medium from which a computer can read.

Figure 1B:
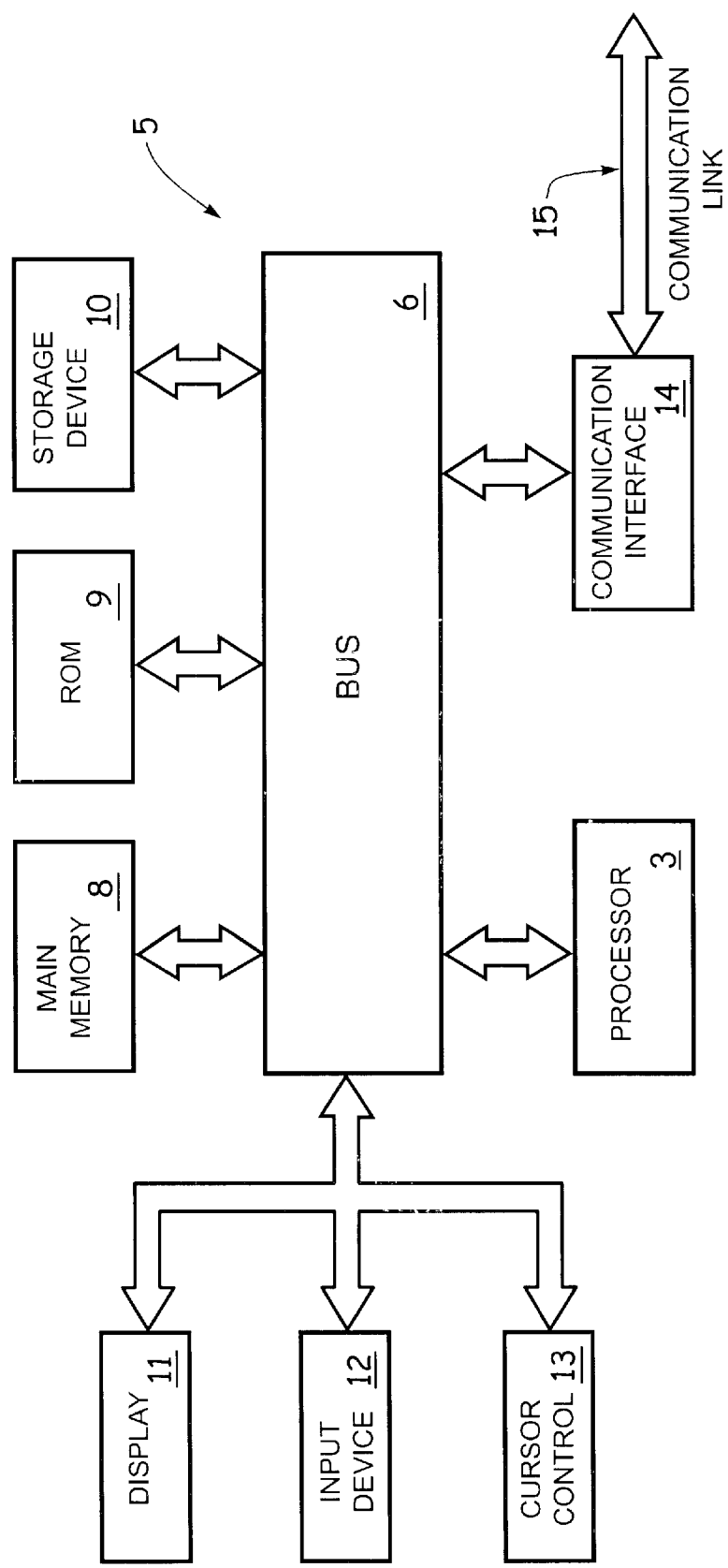
FIG. 1B is a simplified block diagram of an exemplary user station and an exemplary host computer of FIG. 1A.

Referring to FIG. 1B, in an embodiment, each user station 24 and the host computer 22 (each referred to generally as a processing unit) embody a general architecture 5. A processing unit includes a bus 6 or other communication mechanism for communicating instructions, messages and data (collectively, information), and one or more processors 7 coupled with the bus 6 for processing information. A processing unit also includes a main memory 8, such as a random access memory (RAM) or other dynamic storage device, coupled to the bus 6 for storing dynamic data and instructions to be executed by the processor(s) 7. The main memory 8 also may be used for storing temporary data (variables) or other intermediate information during execution of instructions by the processor(s) 7.

A processing unit may further include a read only memory (ROM) 9 or other static storage device coupled to the bus 6 for storing static data and instructions for the processor(s) 7. A storage device 10, such as a magnetic disk or optical disk, may also be provided and coupled to the bus 6 for storing data and instructions for the processor(s) 7.

A processing unit may be coupled via the bus 6 to a display 11, such as a cathode ray tube (CRT), for displaying information to a user. An input device 12, including alpha-numeric and other keys, is coupled to the bus 6 for communicating information and command selections to the processor(s) 7. Another type of user input device may include a cursor control 13, such as a mouse, a trackball, a fingerpad, or cursor direction keys for communicating direction information and command selections to the processor(s) 7 and for controlling cursor movement on the display According to one embodiment of the invention, the individual processing units perform specific operations by their respective processor(s) 7 executing one or more sequences of one or more instructions contained in the main memory 8. Such instructions may be read into the main memory 8 from another computer-readable medium, such as the ROM 9 or the storage device 10. Execution of the sequences of instructions contained in the main memory 8 causes the processor(s) 7 to perform the process steps described herein. In alternative embodiments, hard-wired circuitry may be used in place of or in combination with software instructions to implement the invention. Thus, embodiments of the invention are not limited to any specific combination of hardware circuitry and/or software.

The term "computer-readable medium", as used herein, refers to any medium that provides information to the processor(s) 7. Such a medium may take many forms, including, but not limited to, non-volatile, volatile and transmission media. Non-volatile media, media that can retain information in the absence of power, includes the ROM 9. Volatile media, media that can not retain information in the absence of power, includes the main memory 8. Transmission media includes coaxial cables, copper wire and fiber optics, including the wires that comprise the bus 6. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-readable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (Programmable Read Only Memory), EPROM (Erasable Programmable Read Only Memory), including FLASH-EPROM, any other memory chip or cartridge, carrier waves, or any other medium from which a processor 7 can retrieve information.

Various forms of computer-readable media may be involved in providing one or more sequences of one or more instructions to the processor(s) 7 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 6 may receive the infrared signals and place the instructions therein on the bus 6. The bus 6 may carry the instructions to the main memory 8, from which the processor(s) 7 thereafter retrieves and executes the instructions. The instructions received by the main memory 8 may optionally be stored on the storage device 10, either before or after their execution by the processor(s) 7.

Each processing unit may also include a communication interface 14 coupled to the bus 6. The communication interface 14 provides two-way communication between the respective user stations 24 and the host computer 22. The communication interface 14 of a respective processing unit transmits and receives electrical, electromagnetic or optical signals that include data streams representing various types of information, including instructions, messages and data.

A communication link 15 links a respective user station 24 and a host computer 22. The communication link 15 may be a LAN 26, in which case the communication interface 14 may be a LAN card. Alternatively, the communication link 15 may be a PSTN 28, in which case the communication interface 14 may be an integrated services digital network (ISDN) card or a modem. Also, as a further alternative, the communication link 15 may be a wireless network 30.

A processing unit may transmit and receive messages, data, and instructions, including program code, through its respective communication link 15 and communication interface 14. Received program code may be executed by the respective processor(s) 7 as it is received, and/or stored in the storage device 10, or other associated non-volatile media, for later execution. In this manner, a processing unit may receive messages, data and/or program code in the form of a carrier wave.

Figure 2:
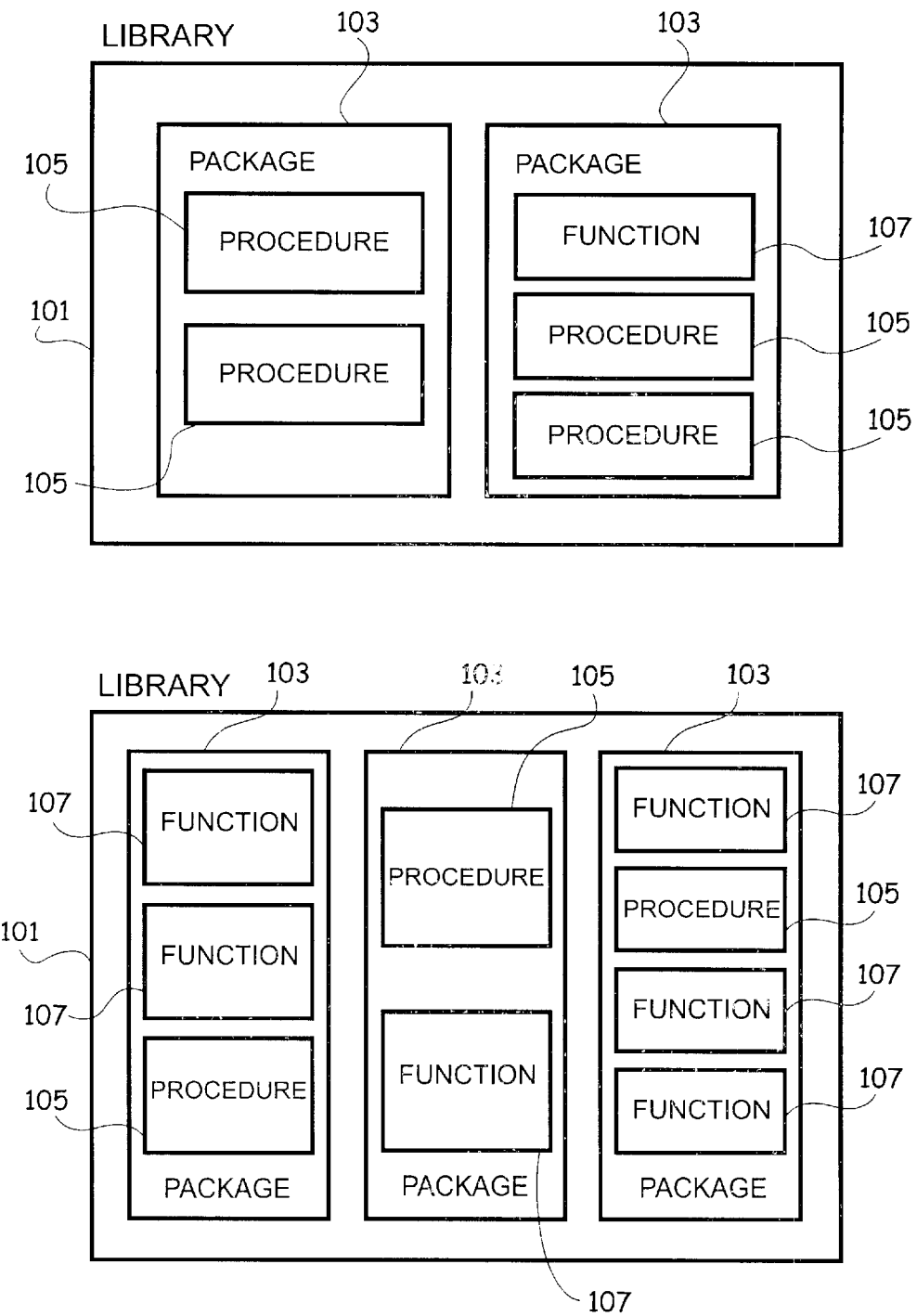
FIG. 2 is a block diagram of an exemplary software library.
Figure 3:
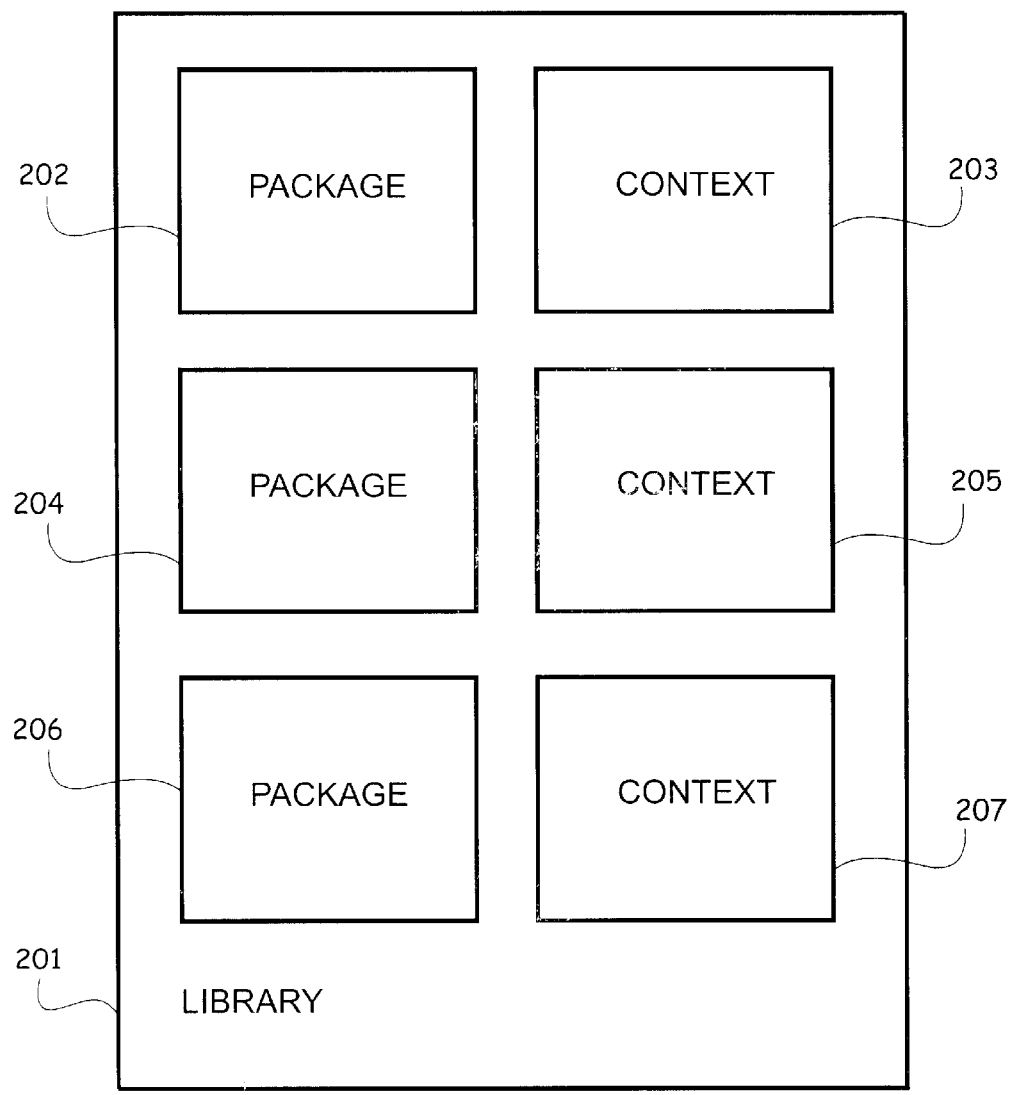
FIG. 3 is a block diagram of a typical known multi-context architecture software library.
Figure 4A:
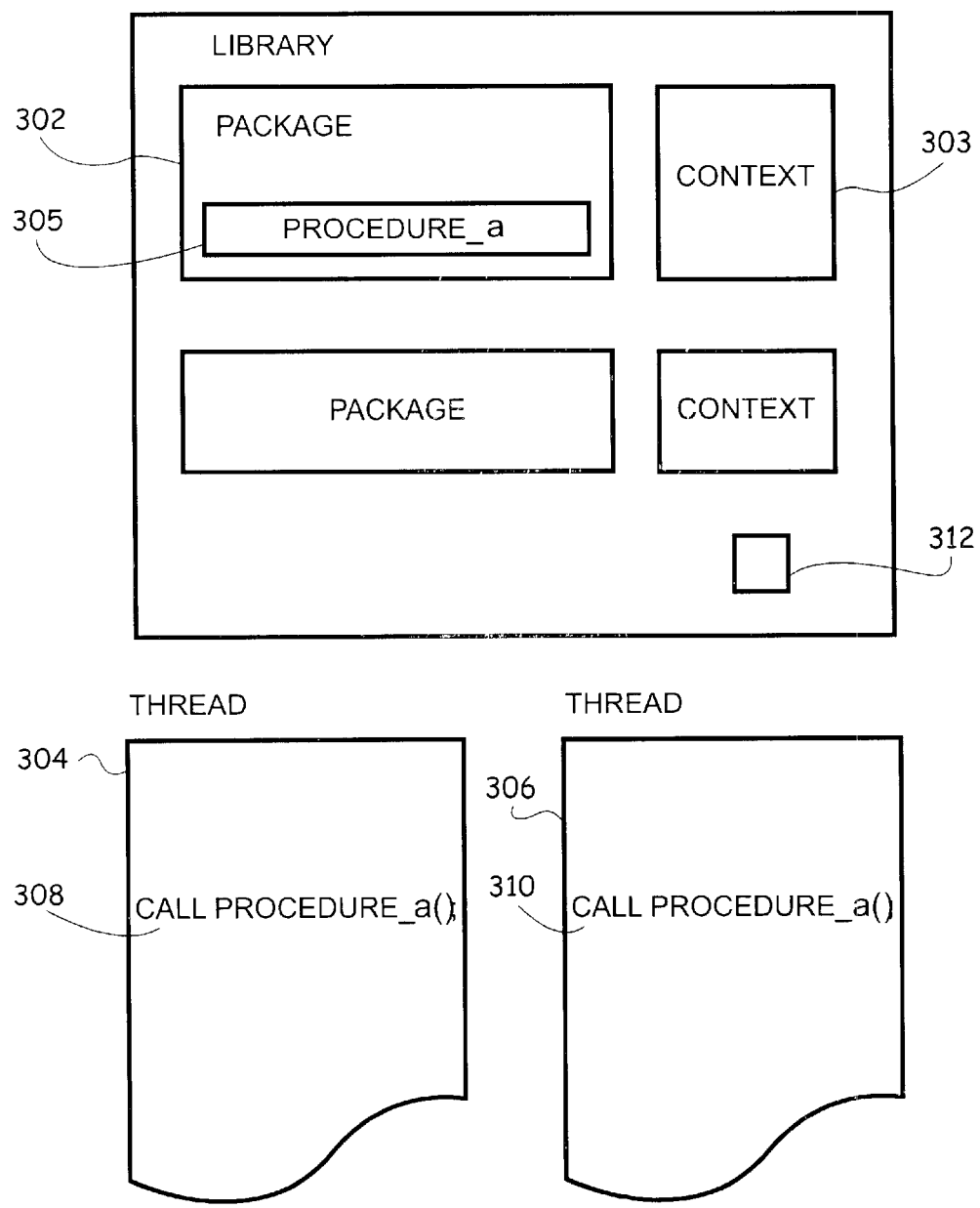
FIG. 4A is a typically known operational example of multiple threads accessing a thread-safe software package.
Figure 4B:
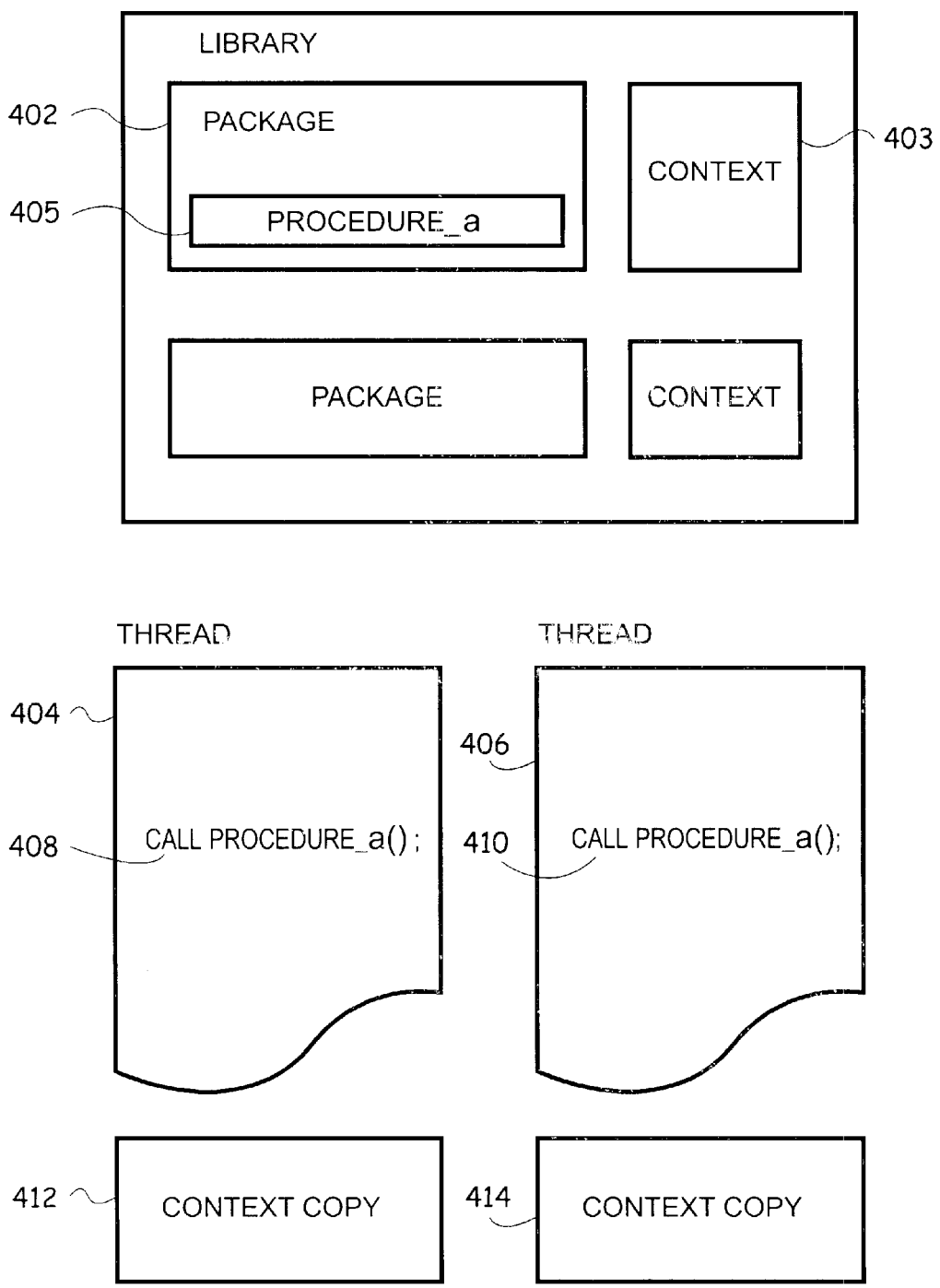
FIG. 4B is a typically known operational example of multiple threads accessing a non thread-safe software package.

Referring to FIG. 2, in an embodiment, software code for a computer system 20 (not shown) is organized into software libraries 101. A software library 101 is a collection of software packages 103. A software package 103 is, in turn, a collection of related procedures 105 and/or functions 107, collectively termed routines, stored together in the computer system for continued use as a unit.

Software code, however, can be organized in a variety of different ways, using a multitude of different identifications for the various components of a system. Thus, while described in terms of the software components, i.e., libraries, packages, routines, etc., depicted in FIG. 2 for ease of explanation, the embodiments of the invention are not limited by this architecture, or its labels, and can be employed with a variety of architectures without departing from their scope and spirit.

In one embodiment, threads access data for related software units, e.g., functions and/or procedures, via a single-context architecture. Therefore, both shared and unshared data may be designated within one software unit.

In one embodiment, each software library, or other designated software component, has a location data segment containing a collection of location variables indicative of the memory location of the resident data segments, i.e., data files, for the respective software units comprising the software component. Therefore, in an embodiment, a context is a location data segment and one context is generated for each software library, or other designated software component, to be used for all the software packages, or other designated software units, comprising the software library.

As previously noted, software code can be organized in a variety of different ways, using a multitude of different identifications for the various components, without departing from the spirit and scope of the invention. For simplicity of explanation, an embodiment of software libraries comprised of software packages further comprised of software routines, e.g., procedures and functions, will be used throughout this description of embodiments of the invention.

In an embodiment, the location variables of the single context of a software library are pointers to the start addresses of the memory locations where the data for each of the software packages is resident. In other embodiments, the single context for a software library contains the addresses, or other location identifier devices, to indicate the memory location where the actual respective data resides. In still other embodiments, the single context of a software library may contain the actual data for each of the respective software packages of the software library.

Figure 5:
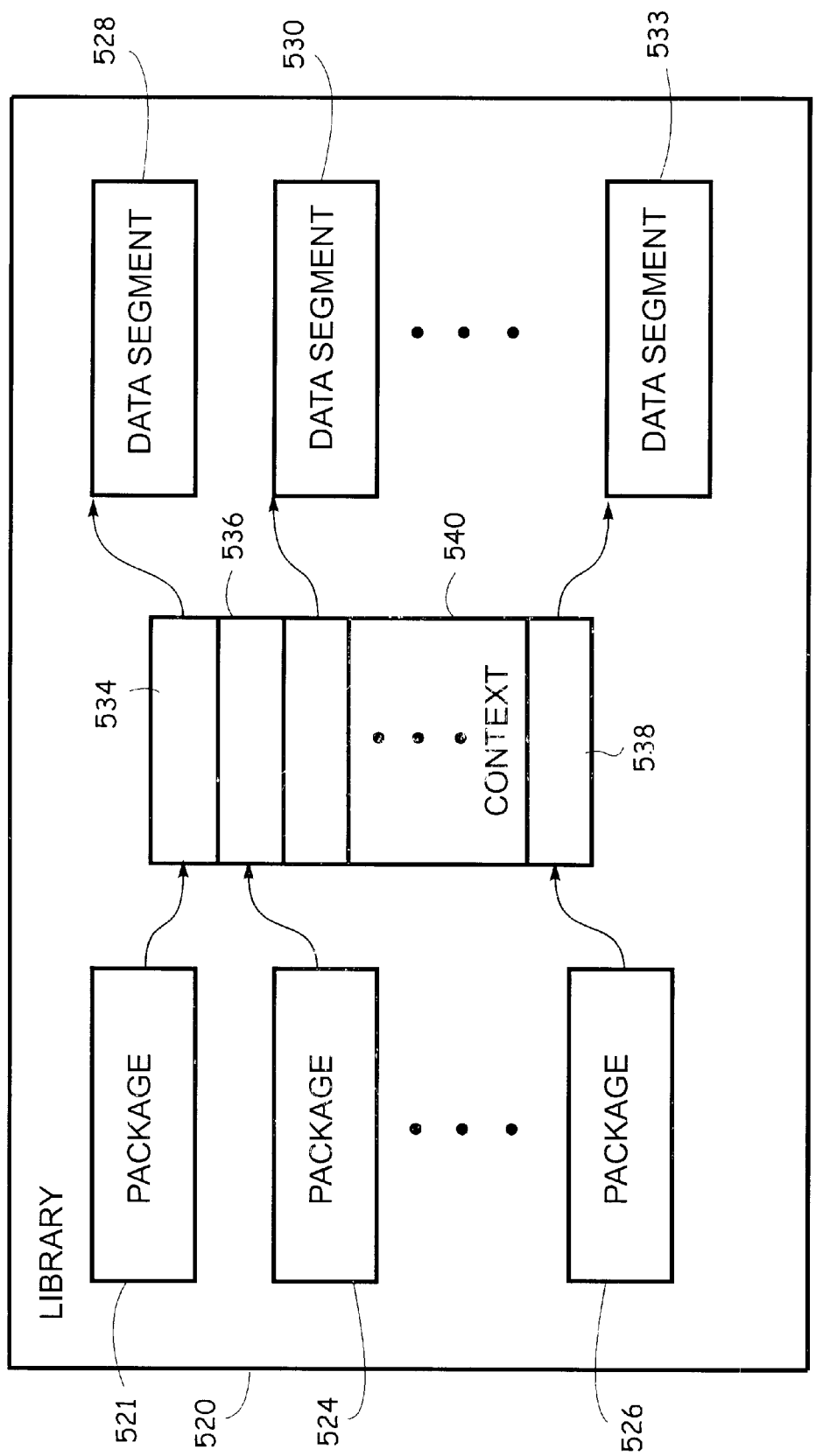
FIG. 5 is a block diagram of a single-context architecture software library.

An example of one embodiment of a single-context architecture is depicted in FIG. 5, wherein a software library 520 contains a plurality of software packages. The software library 520 also contains a single context 540, which is a collection of pointers to the data segments for the respective software packages of the software library 520. Pointer 534 in context 540 indicates data segment 528 associated with the software package 521. Pointer 536 in context 540 indicates data segment 530 associated with the software package 524. Pointer 538 in the context 540 indicates the data segment 533 associated with the software package 526.

Data segment 528 contains the data for the software package 521. Data segment 530 contains the data for the software package 524. Data segment 533 contains the data for the software package 526. When a thread calls a routine in any of the software packages 521, 524 or 526, it need only be cognizant of the one context 540.

Figure 6:
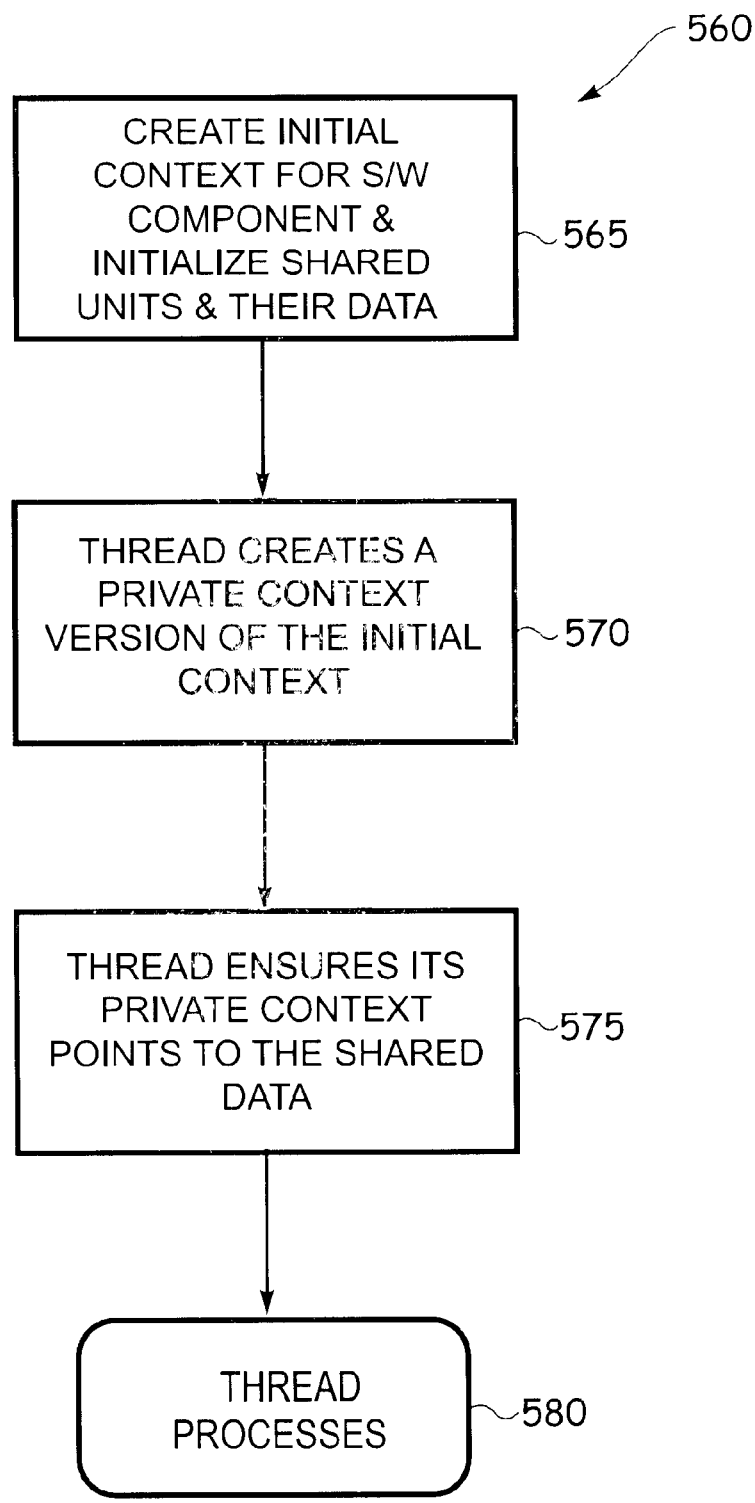
FIG. 6 is a general functional diagram of a single-context/thread-safe architecture software library

In an embodiment, a single context for the software packages of a software library is employed, and all the data for all the software packages of the library is designated shared data. FIG. 6 shows the general functionality 560 for this single-context/thread-safe embodiment. In step 565, an initial context for a software component is created and each of the shared units and their data is initialized. In an embodiment, a main thread performs the functionality of step 565.

In step 570, an individual thread creates a private context version of the initial context of the software component. The thread thereafter ensures 575 that its private context points to the shared data of the units in the software component. In an embodiment, the thread does so by calling a function to set a pointer in the thread's private context to point to the shared data for each unit in the software component that it will access. In another embodiment, the thread calls a function to set a pointer in the thread's private context to point to the shared data for each unit in the software component. The thread thereafter processes 580.

Figure 7:
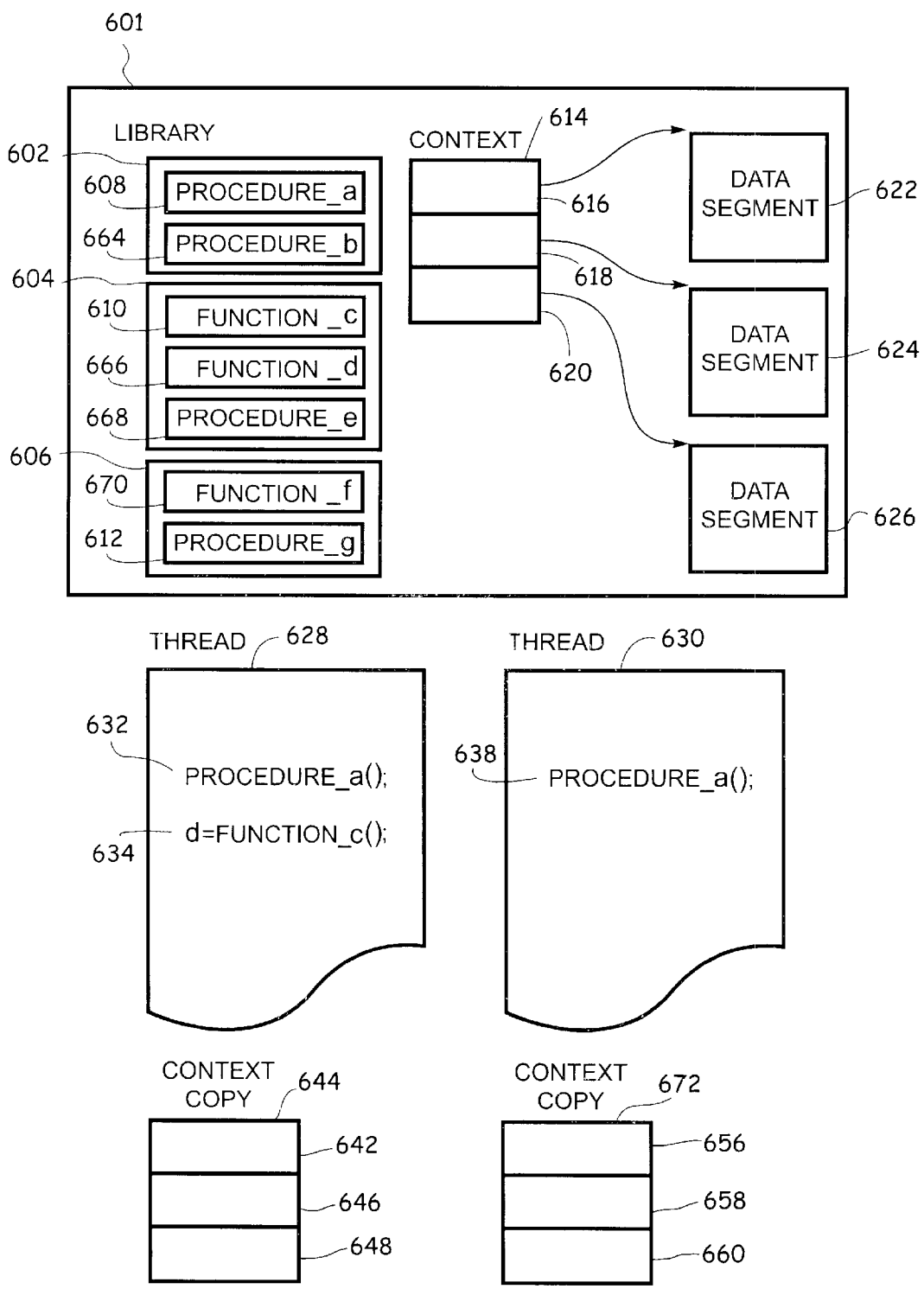
FIG. 7 is an operational example of multiple threads accessing software packages of a single-context/thread-safe architecture software library.

In a more specific, operational example of this single-context/thread-safe architecture, as shown in FIG. 7, a software library 601 contains three software packages, 602, 604 and 606. Software package 602 contains Procedure_a 608 and Procedure_b 664. The associated data for the routines 608 and 664 is stored in data segment 622. All the data in data segment 622 is designated shared data.

Software package 604 contains Function_c 610, Function_d 666 and Procedure_e 668. The associated data for the routines 610, 666 and 668 is stored in data segment 624. All the data in data segment 624 is designated shared data.

Software package 606 contains Function_f 670 and Procedure_g 612. The associated data for the routines 670 and 612 is stored in data segment 626. All the data in data segment 626 is designated shared data.

The software library 601 also contains one context 614 for all its associated software packages 602, 604 and 606. Pointer 616 in context 614 points to the start address in memory of data segment 622, which contains the data for software package 602. Pointer 618 in context 614 points to the start address in memory of data segment 624, which contains the data for software package 604. Pointer 620 in context 614 points to the start address in memory of data segment 626, which contains the data for software package 606.

In this operational example, there are two threads, 628 and 630, executing concurrently. Thread 6 28 calls 632 Procedure_a 608 and calls 634 Function_c 610. Thread 630 calls 638 Procedure_a 608.

As both thread 628 and thread 630 call routines in the various software packages of the software library 601, they each must have a version of the software library's context 614. Thus, a copy 644 of context 614 is created for thread 628 and a copy 672 of context 614 is created for thread 630. The context copies 644 and 672 each have an equivalent structure to context 614, though they do not necessarily contain values equivalent to those in context 614, as described below.

The first pointer in each of the contexts, i.e., pointer 642 of context copy 644, pointer 656 of context copy 672 and pointer 616 of context 614, all point, as necessary, to the start address of the data segment for software package 602. Likewise, the second pointer in each of the contexts, i.e., pointer 646 of context copy 644, pointer 658 of context copy 672 and pointer 618 of context 614, all point, as necessary, to the start address of the data segment for software package 604. The final pointer in each of the contexts, i.e., pointer 648 of context copy 644, pointer 660 of context copy 672 and pointer 620 of context 614, all point, as necessary, to the start address of the data segment for software package 606.

As thread 628 calls 632 Procedure_a 608 of software package 602, it must also access data associated with software package 602. Therefore, in its context copy 644, thread 628 sets pointer 642 to be equivalent to the value of pointer 616 in context 614. Thus, pointer 642 is set to point to the start address of data segment 622, associated with the software package 602. Thread 628 will access data in data segment 622 when it executes Procedure_a 608 in software package 602.

Thread 628 also calls 634 Function_c 610 of software package 604. Thus, thread 628 must access data associated with software package 604. Therefore, in its context copy 644, thread 628 sets pointer 646 to be equivalent to the value of pointer 618 in context 614. Thus, pointer 646 is set to point to the start address of data segment 624, associated with the software package 604. Thread 628 will access data in data segment 624 when it executes Function_c 610 in software package 604.

Thread 628 does not call any routine in the software package 606. Therefore, thread 628 does not need to set a pointer in its context copy 644 to point to a data segment associated with software package 606.

Thread 630 calls 638 Procedure_a 608 of software package 602. Thread 630, then, must also access data associated with software package 602. Therefore, in its context copy 672, thread 630 sets pointer 656 to be equivalent to the value of pointer 616 in context 614. Thus, pointer 656 is set to point to the start address of data segment 622, associated with software package 602. Thread 630 will access data in data segment 622 when it executes Procedure_a 608 in software package 602, thereby, sharing the data in data segment 622 with thread 628.

Thread 630 does not call any routine in software package 604 or software package 606. Therefore, thread 630 does not need to set a pointer in its context copy 672 to point to a data segment associated with software package 604 or a data segment associated with software package 606.

An advantage of the single-context/thread-safe architecture over the multi-context/shared data design is that with a single-context/thread-safe architecture, a thread need only keep track of one context and one manner of accessing that context, for a software library. In contrast, with a multi-context/shared data design, a thread must not only keep track of each context for each respective software package it accesses, but must also know and use the access mechanism of a particular context when executing routines that access data located by that context.

However, a single-context/thread-safe architecture does not address the issue of time critical thread processing requirements. As in the multi-context/shared data design, mutexes must be used to protect the shared data in a single-context/thread-safe architecture. This is because, as previously described, the shared data in any data segment must be protected from multiple threads accessing it simultaneously, one thread "corrupting" the data, as seen and used by another thread. Thus, with a single-context/thread-safe architecture, one or more threads may still be required to wait to access data in a respective data segment. If the wait becomes too long, the thread may not meet its time processing requirements.

For example, assume thread 628 calls 632 Procedure_a 608, thereby gaining access to the associated data segment 622. If thread 630 thereafter calls 638 Procedure_a 608 while thread 628 is still executing Procedure_a 608, then thread 630 will be forced to wait to gain access to data in data segment 622 until thread 628 exits processing in software package 602. If the execution of Procedure_a 608 is time critical to thread 630, and thread 630 is forced to wait to execute Procedure_a 608 until after thread 628 exists it and its respective software package 602, thread 630 processing may fail to meet its performance requirements.

Figure 8:
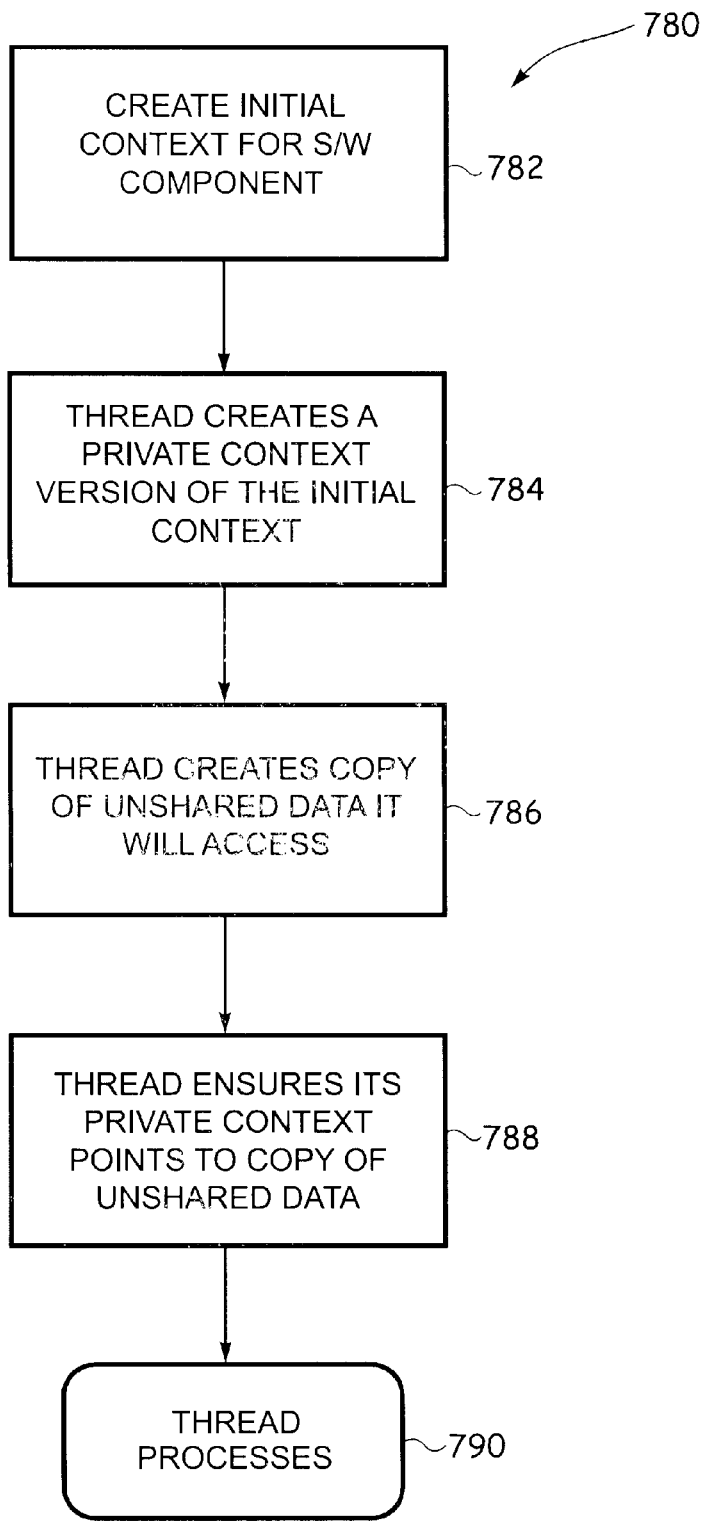
FIG. 8 is a general functional diagram of a single-context/non thread-safe architecture software library.

Thus, in another embodiment, a single context for the software packages of a software library is employed, and all the data for all the software packages of the software library is designated unshared data. FIG. 8 shows the general functionality 780 for this single-context/non thread-safe embodiment. In step 782, an initial context for a software component is created. In an embodiment, a main thread performs the functionality of step 782.

In step 784, an individual thread creates a private context version of the initial context of the software component. The thread then creates 786 a copy of the unshared data for each unit it will access. The thread thereafter ensures 788 its private context points to the copies of unshared data. In an embodiment, the thread does so by setting a pointer in the thread's private context to point to a copy of unshared data, for each copy of unshared data. The thread thereafter processes 790.

Figure 9:
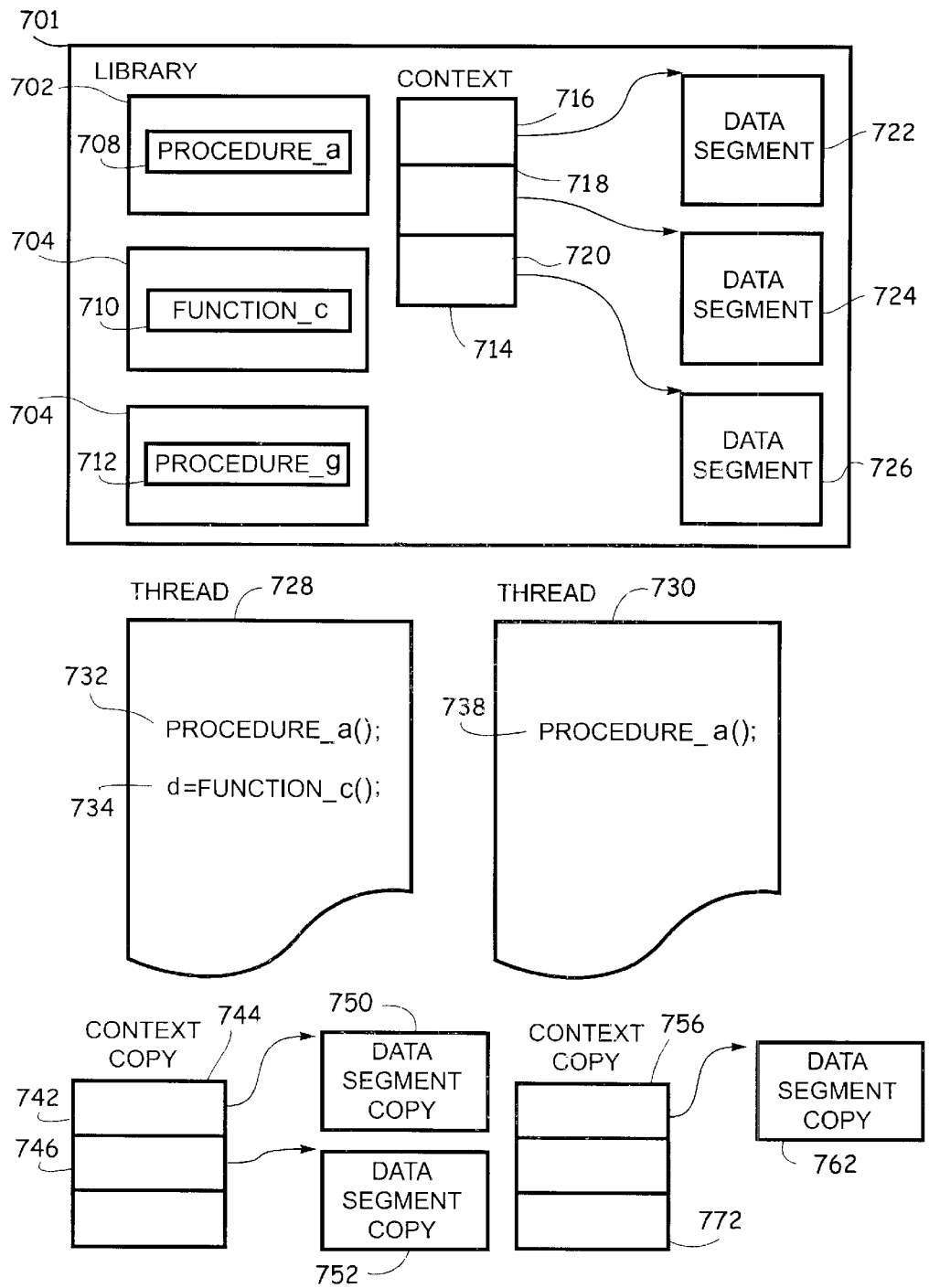
FIG. 9 is an operational example of multiple threads accessing software packages of a single-context/non thread-safe architecture software library.

In an operational example of this single-context/non thread-safe architecture, as shown in FIG. 9, a software library 701 contains three software packages, 702, 704 and 706. Software package 702 contains Procedure_a 708. The associated data for the routines of software package 702 is stored in data segment 722. All the data in data segment 722 is designated unshared data.

Software package 704 contains Function_c 710. The associated data for the routines of software package 704 is stored in data segment 724. All the data in data segment 724 is designated unshared data.

Software package 706 contains Procedure_g 712. The associated data for the routines of software package 706 is stored in data segment 726. All the data in data segment 726 is designated unshared data.

The software library 701 also contains one context 714 for all its associated software packages 702, 704 and 706. Pointer 716 in context 714 points to the start address in memory of data segment 722, which contains the data for software package 702. Pointer 718 in context 714 points to the start address in memory of data segment 724, which contains the data for software package 704. Pointer 720 in context 714 points to the start address in memory of data segment 726, which contains the data for software package 706.

In this operational example, there are two threads, 728 and 730, executing concurrently. Thread 728 calls 732 Procedure_a 708 and calls 734 Function_c 710. Thread 730 calls 738 Procedure_a 708.

As both thread 728 and thread 730 call routines in the various software packages of the software library 701, they each must create a version of the software library's context 714. Thus, a copy 744 of context 714 is created for thread 728, and a copy 772 of context 714 is created for thread 730. The context copies 744 and 772 each have an equivalent structure to context 714, though they do not contain the same values as those in context 714, as described below.

As thread 728 calls 732 Procedure_a 708 of software package 702, it must also access data associated with software package 702. As previously stated, the data in data segment 722 associated with software package 702 is unshared data. Therefore, thread 728 creates a copy 750 of data segment 722, and sets pointer 742 in its context copy 744 to point to the start address of the data segment copy 750. Thus, thread 728 accesses data in the data segment copy 750, and not data in data segment 722, when it executes Procedure_a 708.

Thread 728 also calls 734 Function_c 710 of software package 704, so it must also access software package 704's associated data. As previously stated, the data in data segment 724 associated with software package 704 is unshared data. Thus, thread 728 creates a copy 752 of data segment 724, and sets pointer 746 in its context copy 744 to point to the start address of the data segment copy 752. In this manner, thread 728 accesses data in the data segment copy 752, and not data in data segment 724, when it executes Function_c 710.

Thread 728 does not call any routine in software package 706. Thus, thread 728 does not need to make a copy of the associated data segment 726. Additionally, thread 728 does not need to set a pointer in its context copy 744 to point to the data segment to be used when calling routines from software package 706.

Thread 730 calls 738 Procedure_a 708 of software package 702. Therefore, it must access data associated with this software package 702. As previously stated, the data in data segment 722 associated with software package 702 is unshared data. Thus, thread 730 creates a copy 762 of data segment 722, and sets pointer 756 in its context copy 772 to point to the start address of the data segment copy 762. In this manner, thread 730 accesses data in the data segment copy 762, and not data in data segment 722, when it executes Procedure_a 708.

Thread 730 does not call any routine in software package 704 or software package 706. Therefore, thread 730 does not need to make a copy of data segment 724 or data segment 726. Additionally, thread 730 does not need to set a pointer in its context copy 772 to point to the data segment to be used when calling routines from software package 704 or to point to the data segment to be used when calling routines from software package 706.

An advantage of the single-context/non thread-safe architecture over the multi-context/unshared data design is that, with the single-context/non thread-safe architecture, a thread must only keep track of one context, and one mechanism for accessing the context, when calling the routines of any of the software packages in a library. In contrast, with a multi-context/unshared data design, a thread must keep track of each context, and the associated manner of accessing it, for each software package that it accesses.

However, the single-context/non thread-safe architecture does not allow data to be shared, when this would be advantageous.

Further, the single-context/non thread-safe architecture does not address the issues raised by memory constraints. As with a multi-context/unshared data design, a thread accessing a library with a single-context/non thread-safe architecture must create a copy of the data segment for each software package that it accesses. If many threads are executing concurrently, all creating copies of various data segments, there eventually may not be enough memory to support the copies of the data segments for each thread.

For example, assume that data segment 722 has a relatively large amount of data in it, e.g., one megabyte of data. Because the data in data segment 722 is unshared and both thread 728 and thread 730 access the related software package 702, two additional copies of data segment 722 may be required to be stored in memory at the same time. Thus, at any one time, three megabytes of memory may be required for executing routines in the software package 702 alone. This could place a detrimental strain on the memory budgeting capabilities of the computer system, or, worse yet, be simply unsupportable by the computer system. As more threads concurrently run and execute a routine in software package 702, for example, the memory budgeting issues will only be further exacerbated.

A problem with a multi-context/unshared data design and a single-context/non thread-safe architecture is that there is no flexibility to designate some data as shared, when, for example, the data requires a large amount of memory space, or shared data is otherwise desirable. Similarly, with a multi-context/shared data design and a single-context/thread-safe architecture, there is no flexibility to designate some data as unshared, when, for example, time critical processing is required.

Thus, in another embodiment, a single-context/mixed architecture is employed. In this embodiment, a single context for the software packages of a software library is employed, but some of the software packages have shared data, while others have unshared data.

Figure 10:
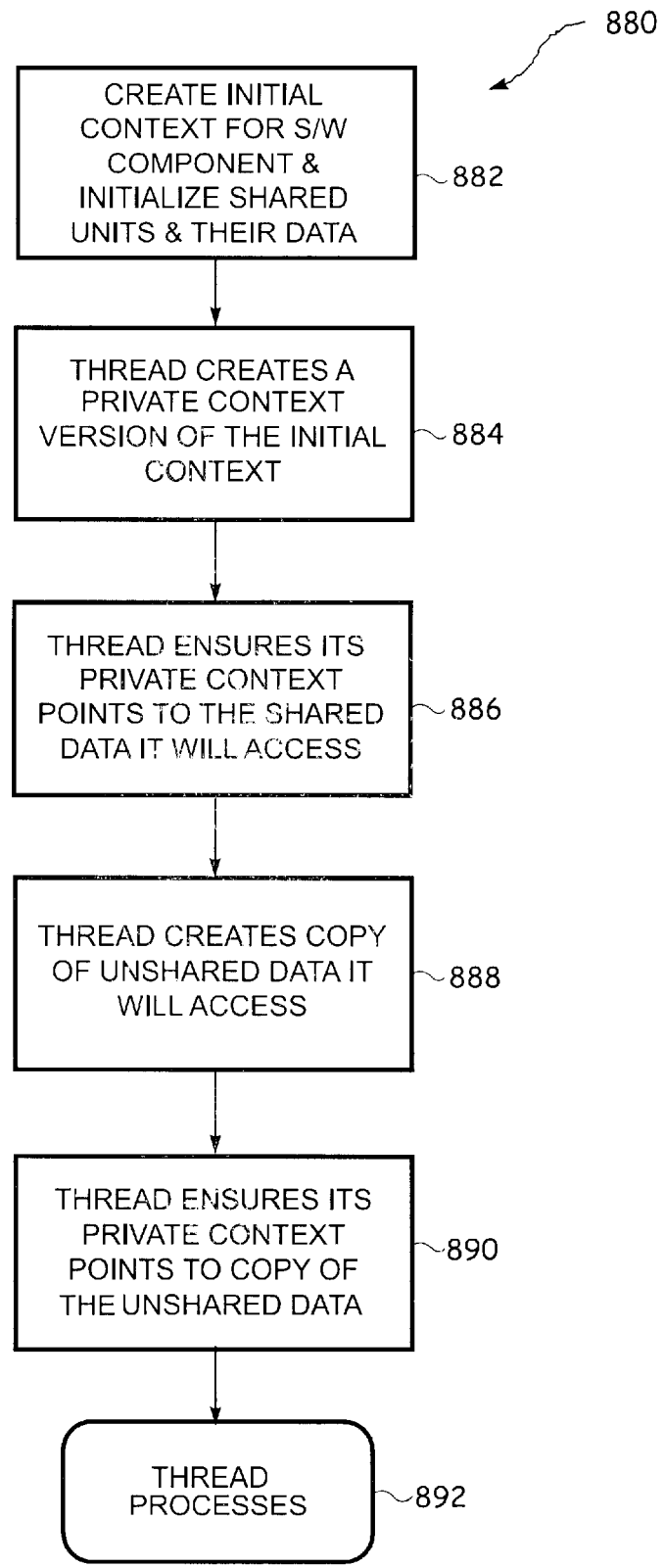
FIG. 10 is a general functional diagram of a single-context/mixed architecture software library.

FIG. 10 shows the general functionality 880 for this single-context/mixed architecture embodiment. In step 882, an initial context for a software component is created and each of the shared units and their data is initialized. In an embodiment, a main thread performs the functionality of step 882.

In step 884, an individual thread creates a private context version of the initial context of the software component. The thread thereafter ensures 886 that its private context points to the shared data of the units in the software component. In an embodiment, the thread does so by calling a function to set a pointer in the thread's private context to point to the shared data for each thread-safe unit in the software component that it will access.

The thread then creates 888 a copy of the unshared data for each non thread-safe unit it will access. The thread thereafter ensures 890 its private context points to the copies of unshared data. In an embodiment, the thread does so by setting a pointer in the thread's private context to point to a copy of unshared data, for each copy of unshared data. The thread thereafter processes 892.

Figure 11:
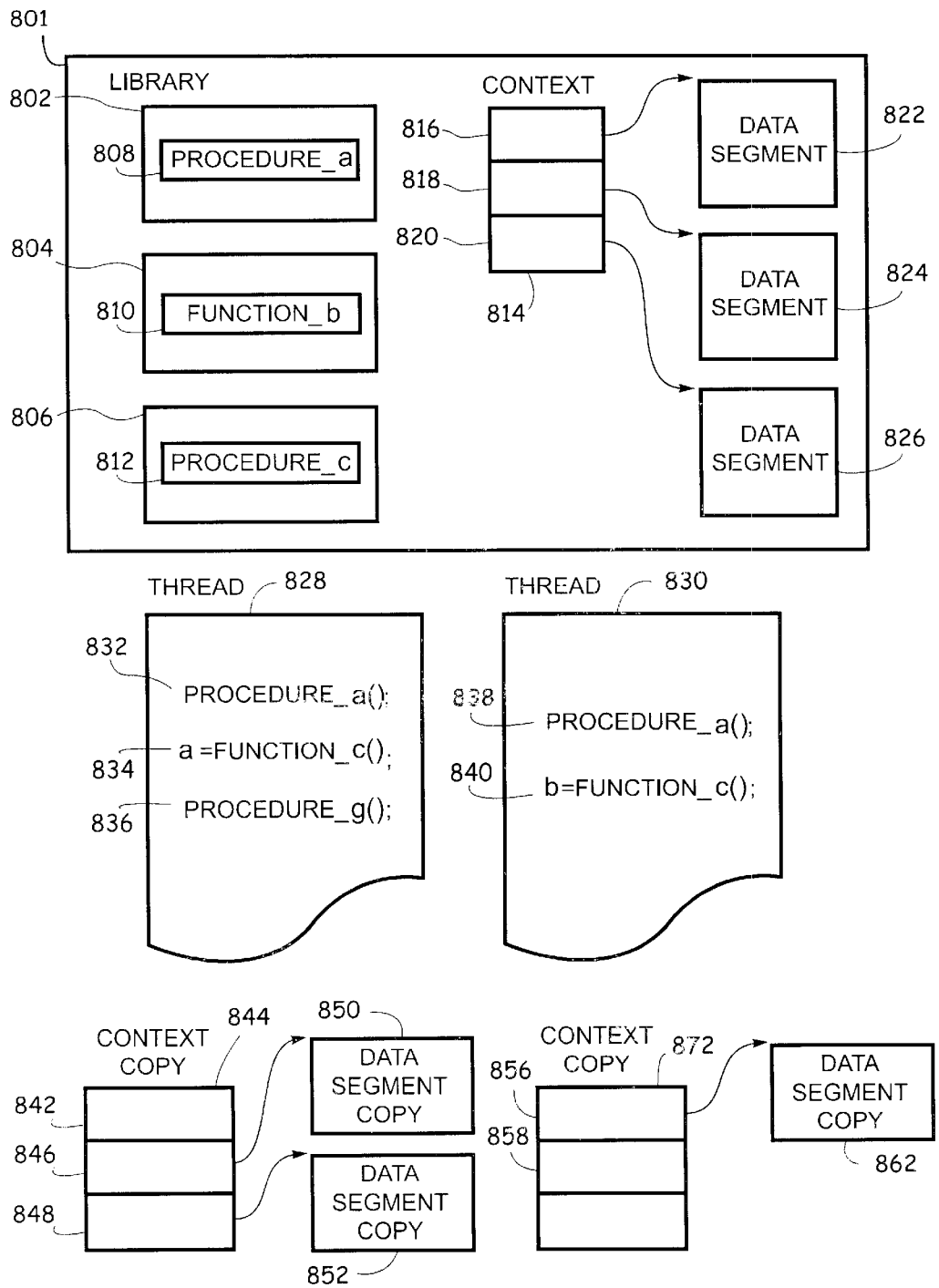
FIG. 11 is an operational example of multiple threads accessing software packages of a single-context/mixed architecture software library.

A specific operational example of a single-context/mixed architecture is depicted in FIG. 11, wherein a software library 801 has three software packages, 802, 804 and 806. Software package 802 contains Procedure_a 808. The associated data for the routines of software package 802 is stored in data segment 822, and is designated shared data.

Software package 804 contains Function_c 810. The associated data for the routines of software package 804 is stored in data segment 824, and is designated unshared data.

Software package 806 contains Procedure_g 812. The associated data for the routines of software package 806 is stored in data segment 826, and is designated unshared data.

The software library 801 also contains one context 814 for all its associated software packages 802, 804 and 806. Pointer 816 in context 814 points to the start address in memory of data segment 822, which contains the data for software package 802. Pointer 818 in context 814 points to the start address in memory of data segment 824, which contains the data for software package 804. Pointer 820 in context 814 points to the start address in memory of data segment 826, which contains the data for software package 806.

In this operational example, there are two threads, 828 and 830, executing concurrently. Thread 828 calls 832 Procedure_a 808, calls 834 Function_c 810 and calls 836 Procedure_g 812. Thread 830 calls 838 Procedure_a 808 and calls 840 Function_c 810.

As both thread 828 and thread 830 call routines in the various software packages of the software library 801, they each must create a version of the software library's context 814. Thus, thread 828 creates a context copy 844 of context 814 and thread 830 creates a context copy 872 of context 814. The context copies 844 and 872 each have an equivalent structure to context 814, though they do not necessarily contain values equivalent to those in context 814, as described below.

As thread 828 calls 832 Procedure_a 808 of software package 802, it must also access data associated with software package 802. As previously stated, the data in data segment 822 associated with software package 802 is shared data. Therefore, thread 828 sets pointer 842 in its context copy 844 to be equivalent to the value of pointer 816 in context 814. Thus, pointer 842 is set to point to the start address of data segment 822, and thread 828 accesses data in data segment 822 when it executes Procedure_a 808.

Thread 828 calls 834 Function_c 810 of software package 804, so it must access data associated with software package 804. As previously stated, the data in data segment 824 associated with software package 804 is unshared data. Thus, thread 828 creates a copy 850 of data segment 824, and sets pointer 846 in its context copy 844 to point to the start address of the data segment copy 850. In this manner, thread 828 accesses data in the data segment copy 850, and not in data segment 824, when it executes Function_c 810.

Thread 828 calls 836 Procedure_g 812 of software package 806. Thus, thread 828 must also access data associated with software package 806. As previously stated, the data in data segment 826 associated with software package 806 is unshared data. Thus, thread 828 creates a copy 852 of data segment 826, and sets pointer 848 in its context copy 844 to point to the start address of the data segment copy 852. In this manner, thread 828 accesses data in the data segment copy 852, and not in data segment 826, when it executes Procedure_g 812.

Thread 830 calls 838 Procedure_a 808 of software package 802. Thus, it must access data associated with software package 802. As previously stated, the data in data segment 822 associated with software package 802 is shared data. Therefore, thread 830 sets pointer 856 in its context copy 872 to be equivalent to the value of pointer 816 in context 814. Thus, pointer 856 is set to point to the start address of data segment 822, and thread 830 accesses data in data segment 822 when it executes Procedure_a 808, thereby sharing data in data segment 822 with thread 828.

Thread 830 calls 840 Function_c 810 of software package 804; it must, therefore, access data associated with software package 804. As previously stated, the data in data segment 824 associated with software package 804 is unshared data. Thus, thread 830 creates a copy 862 of data segment 824, and sets pointer 858 in its context copy 872 to point to the start address of the data segment copy 862. In this manner, thread 830 accesses data in the data segment copy 862, rather than in data segment 824, when it executes Function_c 810. Thus, thread 828 and thread 830 do not share the same data when executing the routines of software package 804; rather they use their own, local, copies of this data respectively.

Thread 830 does not call any routine in software package 806. Therefore, thread 830 does not need to set a pointer in its context copy 872 to point to a data segment for use with the software package 806. Additionally, thread 830 does not need to make a copy of data segment 826, which consists of unshared data, because it has no need for any data associated with the software package 806.

As can be seen, in a single-context/mixed architecture, the best of both designs employing shared data and those employing unshared data is combined. Additionally, the ease and simplicity of a common calling interface to the data of a software component, e.g., library, is supported for thread access.

With a single-context/mixed architecture, a computer system can be designed wherein software packages with relatively large amounts of data have their data designated shared and software packages with relatively small amounts of data have their data designated unshared. Additionally, software packages with routines whose execution is time critical, or which are expected to be called often, can have their data designated unshared while software packages with routines that do not have particularly strenuous time constraints, or which are expected to be called relatively less often, can have their data designated shared. Thus, with a single-context/mixed architecture, a computer system can be designed that coordinates the needs of threads requiring access to time critical routines with the needs of threads requiring access to memory intensive routines.

As previously described, in a computer system where all data is shared, threads must use some mechanism, such as a mutex, to protect against data access concurrency problems. In a single-context/mixed architecture, threads accessing shared data must still protect the data via a mutex. However, the mutex used, and the latency in multi-thread processing created thereby, is only relevant in regards to those software packages that are thread-safe. In a single-context/mixed architecture, as only those software packages with relatively large amounts of data associated with them, or which are expected to be accessed less often, will generally be designed to use shared data, issues of time latency in the computer system may be more optimally handled.

As previously described, in a computer system where all data is unshared, copies of the data segments associated with the various called routines must be created. In a single-context/mixed architecture, threads must still create copies of data segments of those non thread-safe packages they access. However, the memory budgeting issues involved with creating these copies are only relevant with regard to non thread-safe packages. In a single-context/mixed architecture, as only those software packages with relatively small amounts of data associated with them, or which are expected to be accessed often and/or have time-critical routines therein, will generally be designed to use unshared data, issues of memory budgeting within the computer system may also be more optimally managed.

Figure 12:
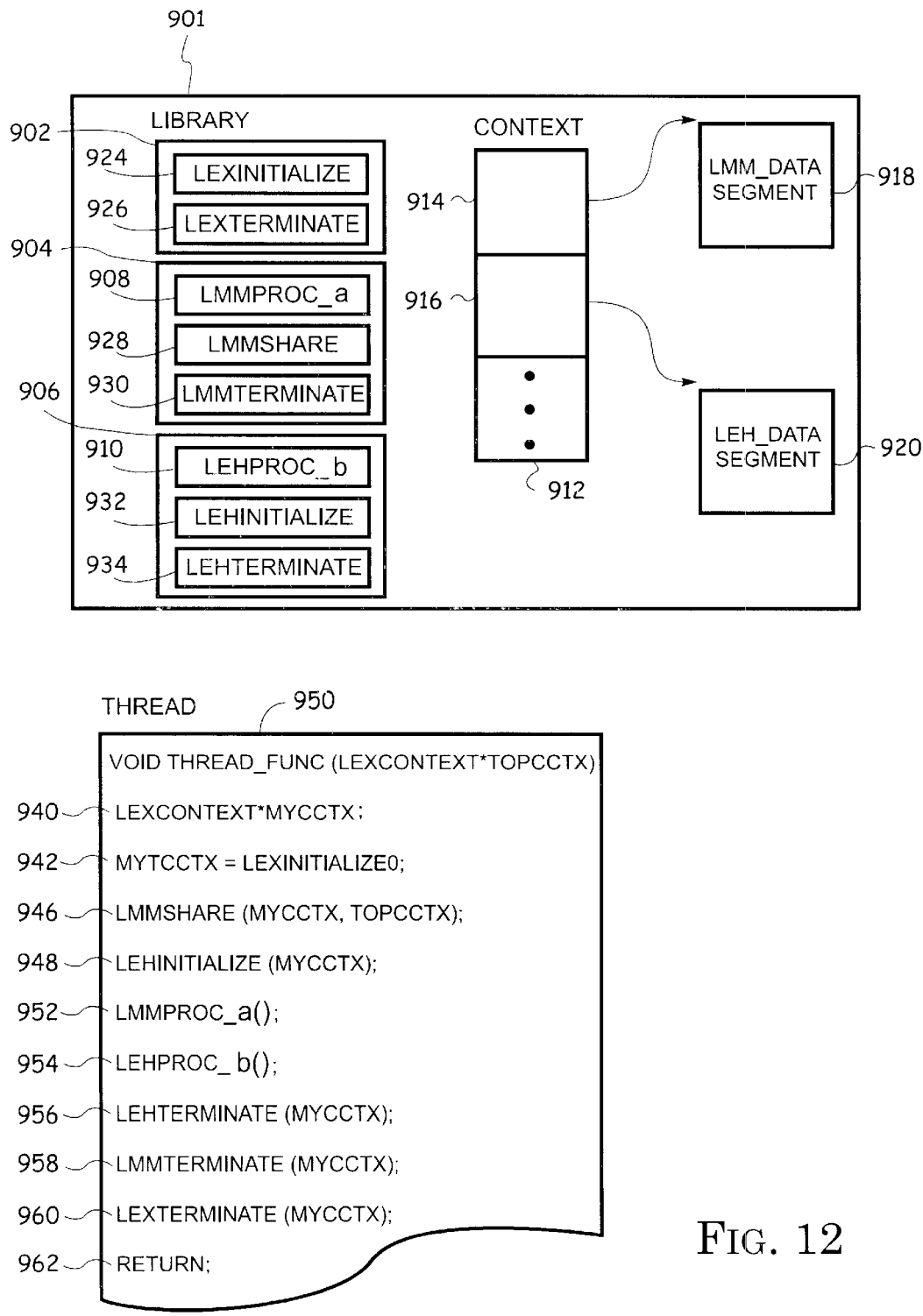
FIG. 12 is a block diagram and exemplary pseudo code for accessing software packages of a single-context/mixed architecture software library.

In FIG. 12, a pseudo code operational example of a thread functioning in a single-context/mixed architecture computer system is shown. The software unit names in FIG. 12 are only exemplary, and are not intended to limit the embodiments of the invention described herein.

A software library 901 includes Lcx__Pkg software package 902, Lmm__Pkg software package 904 and Leh__Pkg software package 906. Lcx__Pkg 902 includes the LcxInitialize routine 924 and the LcxTerminate routine 926. Lmm__Pkg 904 includes the Lmmproc__a routine 908, the LmmShare routine 928 and the LmmTerminate routine 930. Leh__Pkg 906 includes the Lehproc__b routine 910, the LehInitialize routine 932 and the LehTerminate routine 934.

The software library 901 also has a context 912. Context 912 has a pointer 914 that points to the start address in memory of the data segment 918 associated with Lmm__Pkg 904. Context 912 also has a pointer 916 that points to the start address in memory of the data segment 920 associated with Leh__Pkg 906.

The thread thread__func 950 executes pseudo code that accesses the routines of the software library 901. The thread thread__func 950 declares 940 a variable "mycctx" to be used as its local version context. The thread thread func__ 950 then calls 942 the function LcxInitialize 924 to create a copy of the structure of context 912 in the variable mycctx.

The thread thread__func 950 accesses 952 a routine in Lmm__Pkg 904. Lmm__Pkg 904 is a thread-safe package; i.e., its data is shared. Thus, thread__func 950 calls 946 the procedure LmmShare 928 to set an appropriate pointer value in the local context copy mycctx equivalent to the value of the pointer in context 912 to data segment 918 associated with Lmm__Pkg 904. Consequently, an appropriate pointer in the local context mycctx is set to point to the start address of data segment 918.

The thread thread__func 950 also accesses 954 a routine in Leh__Pkg 906. Leh__Pkg 906 is a non thread-safe package; i.e., its data is unshared. Thus, thread__func 950 calls 948 the procedure LehInitialize 932 to create a local copy of data segment 920 associated with Leh__Pkg 906 and to set an appropriate pointer in the local context mycctx to point to the start address of the local data segment copy.

The thread thread__func 950 thereafter performs its task, calling 952 Lmmproc__a 908 in software package 904 and calling 954 Lehproc__b 910 in software package 906.

When thread__func 950 completes its task, it terminates, or deletes, the local data versions associated with the software library 901. The thread thread__func 950 calls 956 the procedure LehTerminate 934 to terminate the local copy of the data segment 920. It also calls 958 the procedure LmmTerminate 930 to terminate its pointer link in its local context to data segment 918. And, thread__func 950 calls 960 the procedure LcxTerminate 926 to terminate the local context copy mycctx. The thread thread__func 950 then ends 962 its processing.

In another embodiment of the invention, a single-context/universal mixed architecture is employed. In a single-context/universal mixed architecture computer system, each software library is additionally associated with a data segment containing data to be shared by all the software packages of the software library, and designed to be treated as shared data. Also each software library in this computer system is associated with a data segment containing data that, while it is to be shared by all the software packages of the software library, is treated as unshared data. In essence, the data segment of shared data to be used by the entire software library can be thought of as global/global data; it is shared data and it is treated as shared data. Additionally, the data segment of unshared data to be used by the entire software library can be thought of as global/local data. It is shared data in that it can be used by all the software packages of the software library. Yet, it is treated as unshared data in that each thread accessing the software library must create its own local copy of this data segment.

Figure 13:
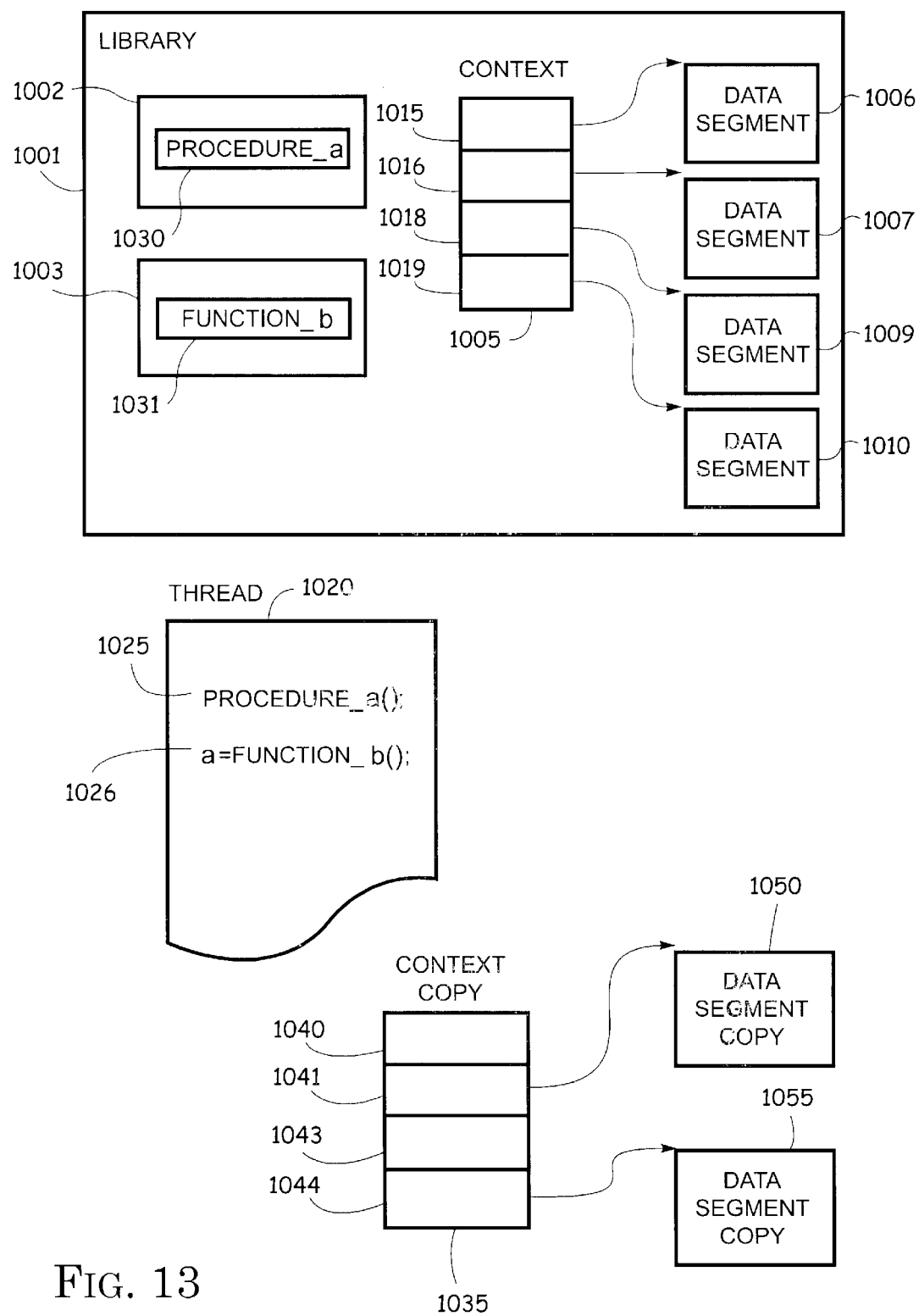
FIG. 13 is an operational example of a thread accessing software packages of a single-context/universal mixed architecture software library.

FIG. 13 depicts an operational example of a thread processing in a single-context/universal mixed architecture computer system. Software library 1001 includes two software packages 1002 and 1003. Software package 1002 includes a routine Procedure__a 1030. The associated data for software package 1002, stored in data segment 1006, is shared.

Software package 1003 includes a routine Function__b 1031. The associated data for software package 1003, stored in data segment 1007, is unshared.

The software library 1001 also has a global/global data segment 1009, to be used by all the software packages in the software library 1001 and to be accessed as shared data. Additionally, the software library 1001 has a global/local data segment 1010, to also be used by all the software packages in the software library 1001, but to be accessed as unshared data.

The software library 1001 has an associated context 1005. Pointer 1015 in context 1005 points to the start address in memory of data segment 1006, which is associated with software package 1002. Pointer 1016 in context 1005 points to the start address in memory of data segment 1007, which is associated with software package 1003. Pointer 1018 in context 1005 points to the start address in memory of data segment 1009, which comprises the global/global data for the software library 1001. Pointer 1019 in context 1005 points to the start address in memory of data segment 1010, which comprises the global/local data for the software library 1001.

In FIG. 13, one exemplary thread 1020 executes. Thread 1020 calls 1025 Procedure_a 1030 and calls 1026 Function_b 1031. Thread 1020, because it calls routines in the software packages of the software library 1001, creates a copy 1035 of the software library's context 1005.

As thread 1020 calls 1025 Procedure_a 1030 of software package 1002, it must also access data associated with software package 1002. As previously described, software package 1002 is thread-safe; i.e., its data is shared. Thus, thread 1020 sets pointer 1040 in its context copy 1035 to be equivalent to the value of pointer 1015 in context 1005. Pointer 1040, therefore, is set to point to the start address of data segment 1006.

Also, thread 1020 calls 1026 Function_b 1031 of software package 1003. Therefore, it must access data associated with software package 1003. As previously described, software package 1003 is non thread-safe; i.e., its data is unshared. Thus, thread 1020 creates a copy 1050 of data segment 1007 associated with software package 1003, and sets pointer 1041 in context copy 1035 to point to the start address of the data segment copy 1050.

As thread 1020 calls various routines in the software packages of the software library 1001, it also likely requires access to the software library's global/global data. As previously described, the global/global data is shared by all the software package s of the software library 1001. Thus, thread 1020 sets pointer 1043 in context copy 1035 to be equivalent to the value of pointer 1018 in context 1005. Pointer 1043 is, therefore, set to point to the start address of data segment 1009, which contains the global/global data for the software library 1001.

Thread 1020 also likely requires access to the software library's global/local data. As previously described, the global/local data is used by all the software packages of the software library 1001, but is accessed as unshared data. Thus, thread 1020 creates a copy 1055 of data segment 1010, which contains the global/local data of the software library 1001. Thread 1020 also sets pointer 1044 in context copy 1035 to point to the start address of the data segment copy 1055.

In an embodiment, in a single-context/universal mixed architecture, a software library's common context elements are grouped together. Thus, the context for a software library is configured such that the pointers to the data segments containing shared data are grouped together and the pointers to the data segments containing unshared data are also grouped together. In another embodiment, the data segments stored in memory for a software library may be similarly grouped and collocated, with those data segments having shared data grouped together and those data segments having unshared data grouped together.

Figure 14:
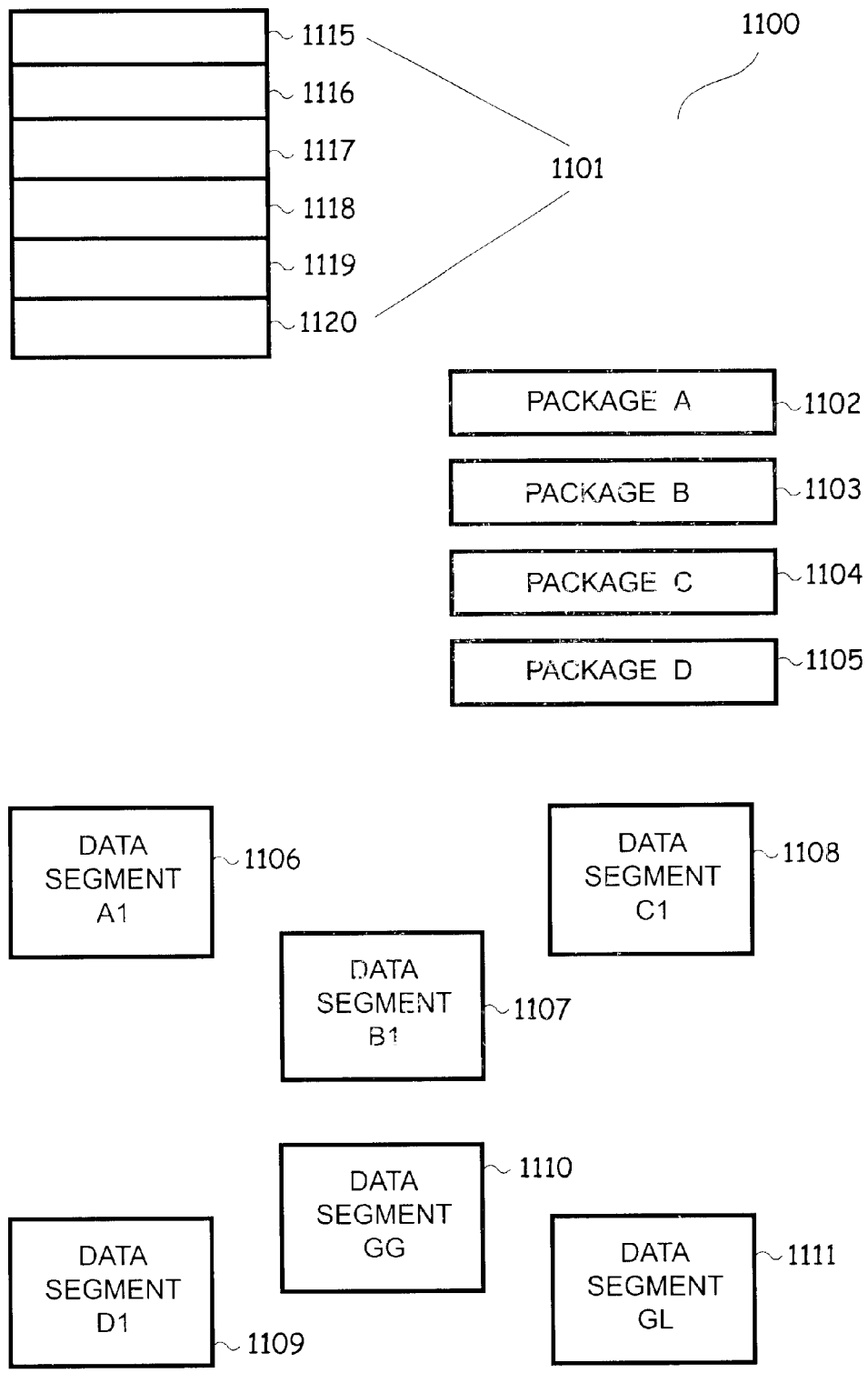
FIG. 14 is a block diagram of the memory storage of a single-context/universal mixed architecture software library.

The software library 1100 of FIG. 14 depicts an exemplary context memory configuration in an embodiment of a single-context/universal mixed architecture. Software library 1100 is comprised of software packages A 1102, B 1103, C 1104 and D 1105. Software packages A 1102, B 1103 and C 1104 are all thread-safe packages, i.e., all use shared data. Software package D 1105, alternatively, is a non thread-safe package, i.e., uses unshared data.

Data segment A1 1106 is associated with software package A 1102, data segment B1 1107 is associated with software package B 1103 and data segment C1 1108 is associated with software package C 1104. All three data segments A1 1106, B1 1107 and C1 1108 have shared data. Data segment D1 1109 is associated with software package D 1105, and, thus, is comprised of unshared data.

The global/global data for the software library 1100 is stored in data segment GG 1110. The global/local data for the software library 1100 is stored in data segment GL 1111.

Pointer 1115 of context 1101 of software library 1100 points to the start address in memory of data segment A1 1106; pointer 1116 points to the start address in memory of data segment B1 1107; pointer 1117 points to the start address in memory of data segment C1 1108; and, pointer 1118 points to the start address in memory of data segment GG 1110. As data segments A1 1106, B1 1107, C1 1108 and GG 1110 all have shared data, respective pointers 1115, 1116, 1117 and 1118 are all grouped and stored together in context 1101.

Pointer 1119 of context 1101 points to the start address in memory of data segment D1 1109 and pointer 1120 points to the start address in memory of data segment GL 1111. As data segments D1 1109 and GL 1111 both have unshared data, respective pointers 1119 and 1120 are grouped together and stored in context 1101 following the pointers to the data segments of shared data.

While embodiments are disclosed herein, many variations are possible which remain within the spirit and scope of the invention. Such variations are clear upon inspection of the specification, drawings and claims herein. The invention therefore is not to be restricted except by the scope of the appended claims.

What is claimed is as follows:

1. A multi-thread process comprising:
    creating a context, said context comprising location variables, said location variables each indicative of an address of data;
    creating a version of said context; and
    setting a location variable in said version of said context to indicate an address of said data.

2. The multi-thread process of claim 1, wherein said data is comprised of subsets of data, and said set location variable in said version of said context is indicative of an address of a subset of data comprising shared data.

3. The multi-thread process of claim 1, wherein said location variables in said context and said location variables in said version of said context comprise pointers.

4. The multi-thread process of claim 1, wherein said data is comprised of subsets of data, said process further comprising:
    creating a copy of a subset of said data; and
    setting a second location variable in said version of said context to indicate an address of said copy of said subset of said data.

5. The multi-thread process of claim 4, wherein said copy of said subset of said data is a copy of a subset of data comprising unshared data.

6. The multi-thread process of claim 4, wherein said location variables in said context and in said version of said context comprise pointers.

7. A system that implements multi-thread processing, comprising:
a computer comprising software code, wherein said software code creates a context, said context comprising pointers to data,
creates a version of said context, and
sets a pointer in said version of said context to point to an address of said data.

8. The system of claim 7, wherein said data is comprised of subsets of data, and said pointer in said version of said context is set to point to an address of a subset of said data comprising shared data.

9. The system of claim 8, wherein said software code creates a version of said context for a thread before said thread executes instructions requiring a subset of said data.

10. The system of claim 7, wherein said data is comprised of subsets of data and said software code further creates a copy of a subset of said data, and
sets a second pointer in said version of said context to point to an address of said copy of said subset of said data.

11. The system of claim 10, wherein said copy of said subset of said data is a copy of a subset of data comprising unshared data.

12. A computer implemented method of thread processing, wherein a context exists for a software library that contains two or more software packages, each of the software packages comprising one or more computer program instructions, said method comprising:
creating a first table of entries for a first software thread;
setting a first entry of the first table of entries to point to the same address for a first set of data to be accessed by a first software package of the software library that the first entry of the context points to;
setting a second entry of the first table of entries to point to an address for a first copy of a second set of data to be accessed by a second software package of the software library, wherein the address in the second entry of the first table of entries is different than the address in the second entry of the context;
creating a second table of entries for a second software thread;
setting a first entry of the second table of entries to point to the same address for the first set of data to be accessed by the first software package of the software library that the first entry of the context points to; and
setting a second entry of the second table of entries to point to an address for a second copy of the second set of data to be accessed by the second software package of the software library, wherein the address in the second entry of the second table of entries is different than the address in the second entry of the first table of entries and is also different than the second entry of the context.

13. The computer implemented method of thread processing of claim 12, wherein said step of setting a first entry of the first table of entries is executed prior to the first software thread executing the first software package of the software library.

14. The computer implemented method of thread processing of claim 13, wherein said step of setting a first entry of the second table of entries and said step of setting a second entry of the second table of entries are both executed prior to the second software thread executing the first software package of the software library.

15. The computer implemented method of thread processing of claim 12, further comprising the steps of:
deleting the first copy of the second set of data at some time after the first software thread executes the second software package; and
deleting the second copy of the second set of data at some time after the second software thread executes the second software package.

16. The computer implemented method of thread processing of claim 12, further comprising the steps of:
deleting the first table of entries for the first software thread at some time after the first software thread executes both the first software package and the second software package; and
deleting the second table of entries for the second software thread at some time after the second software thread executes both the second software package and the second software package.

17. The computer implemented method of claim 12, wherein the first set of data comprises shared data.

18. The computer implemented method of claim 12, wherein the second set of data comprises unshared data.

19. The computer implemented method of claim 12, wherein the context is a table of pointers and each pointer of the context points to a start address for the location of a set of data for a software package of the software library.

20. The computer implemented method of thread processing of claim 12, wherein said step of creating the second copy of the second set of data and said step of setting a second entry of the second table of entries are both executed prior to the first software thread executing the first software package and prior to the first software thread executing the second software package.

21. A system for multi-thread processing, comprising:
a computer;
a data storage device, said data storage device having stored thereon a software library comprising two or more software packages, wherein each of the software packages comprises one or more computer program instructions,
the data storage device storing a first set of data for a first software package and a second set of data for a second software package, and
the data storage device storing a context for the software library, wherein a first entry of the context comprises a first pointer for addressing the first set of data and a second entry of the context comprises a second pointer for addressing the second set of data; and
a user station comprising software code to
create a table of entries for a first software thread,
set a first entry of the table of entries to point to the first set of data, and
set a second entry of the table of entries to point to a third set of data, wherein the third set of data is a copy of the second set of data.

22. The system for multi-thread processing of claim 21, wherein the software code of said user station executes a first software thread that calls both the first software package and the second software package.

23. The system for multi-thread processing of claim 22, wherein the software code of the user station creates the table of entries prior to executing the first software thread.

24. The system for multi-thread processing of claim 21, wherein the first set of data comprises shared data.

25. The system for multi-thread processing of claim 24, wherein the second set of data comprises unshared data.

26. The system for multi-thread processing of claim 21, wherein the user station further comprises software code to create a second table of entries for a second software thread, set a first entry of the second table of entries to point to the first set of data, and set a second entry of the second table of entries to point to a fourth set of data, wherein the fourth set of data is a copy of the second set of data.

27. The system for multi-thread processing of claim 26, wherein the user station comprises software code to delete the third set of data at some time after the first software thread executes the second software package, and software code to delete the fourth set of data at some time after the second software thread executes the second software package.

28. A machine readable medium having stored thereon a program comprising computer instructions for creating a first context for a first software thread;

setting a first entry of the first context to point to an address for locating a first set of data for a first software program;

setting a second entry of the first context to point to an address for locating a first copy of a second set of data for a second software program;

creating a second context for a second software thread;

setting a first entry of the second context to point to an address for locating the first set of data; and setting a second entry of the second context to point to an address for locating a second copy of the second set of data.

29. The machine readable medium of claim 28, wherein the first set of data comprises shared data and the second set of data comprises unshared data.

30. The machine readable medium of claim 28, further comprising computer instructions for deleting the first copy of the second set of data some time after the first software thread executes the second software program and computer instructions for deleting the second copy of the second set of data some time after the second software thread executes the second software program.

31. The machine readable medium of claim 28, wherein the first software thread is executed concurrently with the second software thread.

* * * * *

UNITED STATES PATENT AND TRADEMARK OFFICE
CERTIFICATE OF CORRECTION

PATENT NO.      : 6,493,740 B1
DATED           : December 10, 2002
INVENTOR(S)     : David R. Lomax It is certified that error appears in the above-identified patent and that said Letters Patent is hereby corrected as shown below:

<u>Title page,</u>
Item [56], References Cited, U.S. PATENT DOCUMENTS, please replace the inventor "Tavanian et al." with -- Tevanian et al. --

Signed and Sealed this

Seventh Day of October, 2003

JAMES E. ROGAN
*Director of the United States Patent and Trademark Office*